July 2, 1968   W. W. BALDWIN ETAL   3,390,791
PALLET APPARATUS FOR AUTOMATICALLY PARKING VEHICLES
Original Filed April 1, 1964   22 Sheets-Sheet 1

INVENTOR.
WILLIAM W. BALDWIN   C. DANA McCOY
MILTON BODIN   LEON ZINN
BY
ATTORNEY

July 2, 1968  W. W. BALDWIN ET AL  3,390,791
PALLET APPARATUS FOR AUTOMATICALLY PARKING VEHICLES
Original Filed April 1, 1964  22 Sheets-Sheet 2
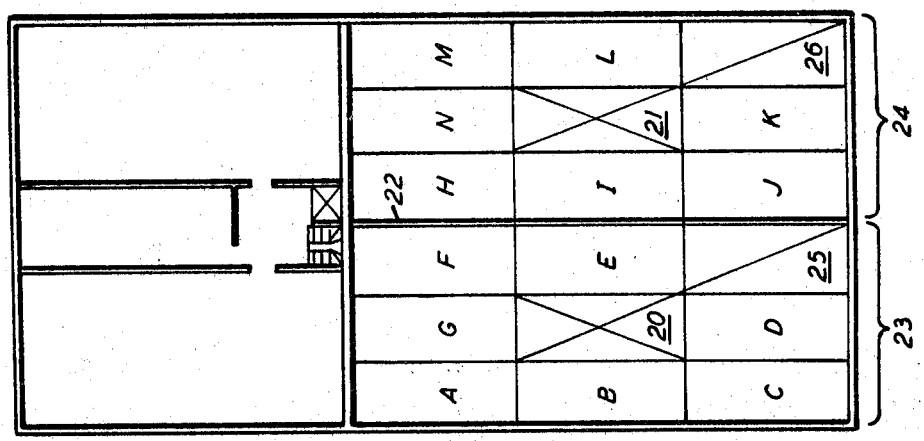
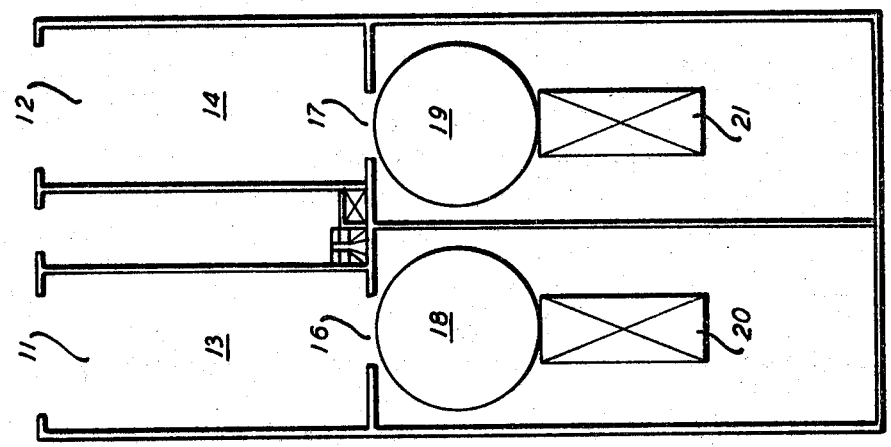
INVENTOR.
WILLIAM W. BALDWIN  C. DANA McCOY
MILTON BODIN  LEON ZINN
BY
ATTORNEY INVENTOR.
WILLIAM W. BALDWIN  LEON ZINN
MILTON BODIN  C. DANA McCOY
BY
ATTORNEY July 2, 1968 W. W. BALDWIN ET AL 3,390,791
PALLET APPARATUS FOR AUTOMATICALLY PARKING VEHICLES
Original Filed April 1, 1964 22 Sheets-Sheet 5
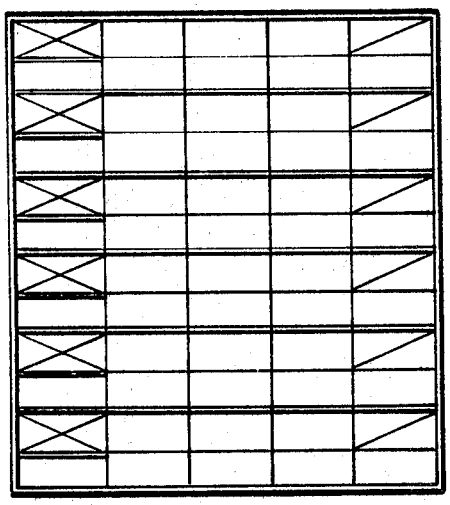
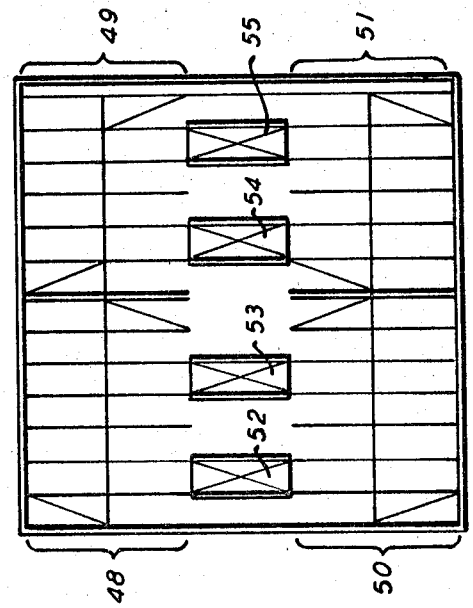
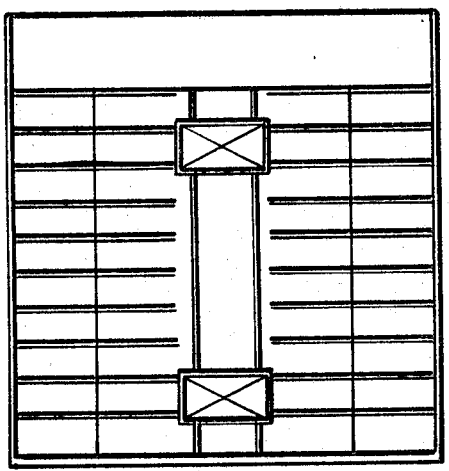
INVENTOR.
WILLIAM W. BALDWIN    C. DANA McCOY
MILTON BODIN    LEON ZINN
BY
ATTORNEY July 2, 1968  W. W. BALDWIN ET AL  3,390,791
PALLET APPARATUS FOR AUTOMATICALLY PARKING VEHICLES
Original Filed April 1, 1964  22 Sheets-Sheet 7
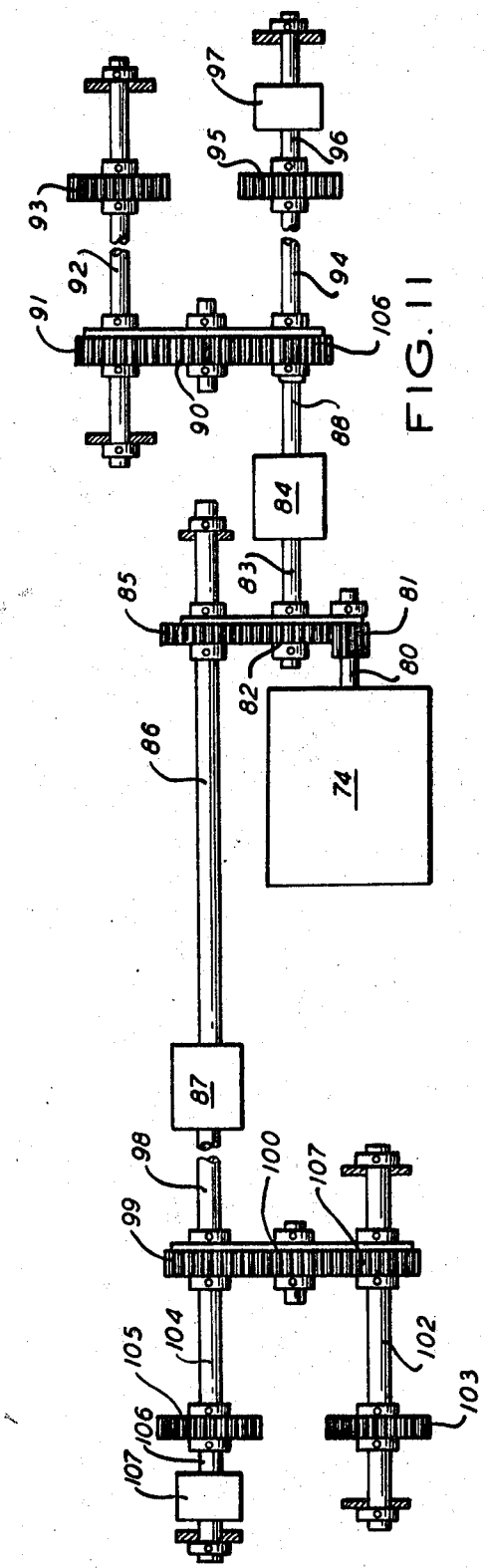
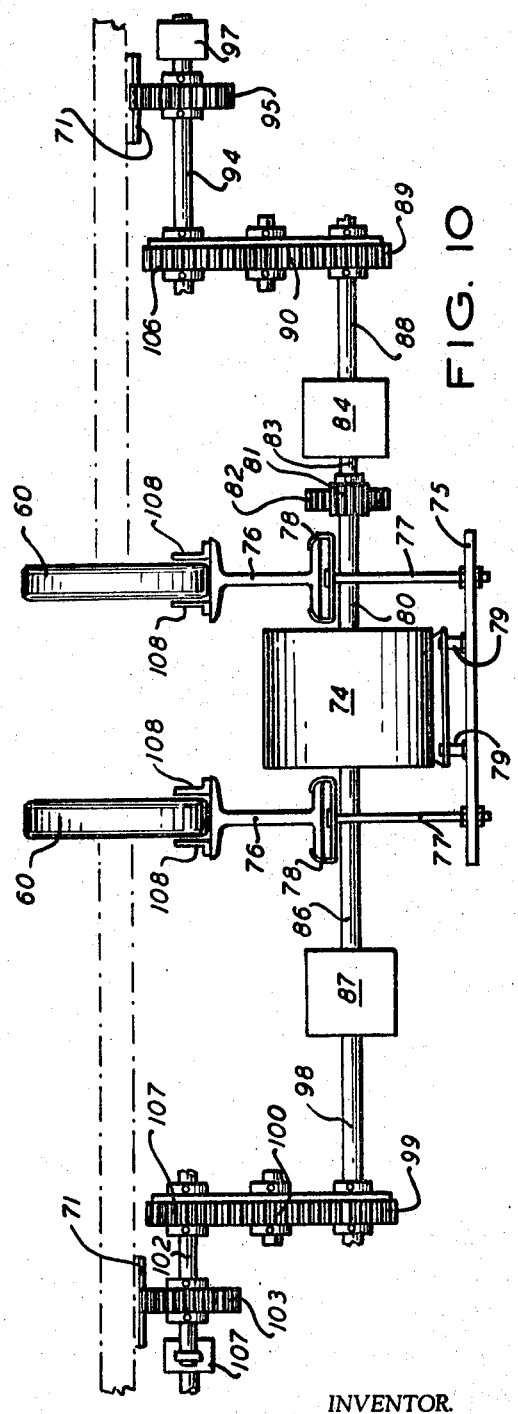
INVENTOR.
WILLIAM W. BALDWIN  C. DANA McCOY
MILTON BODIN  LEON ZINN
BY
ATTORNEY July 2, 1968    W. W. BALDWIN ET AL    3,390,791
PALLET APPARATUS FOR AUTOMATICALLY PARKING VEHICLES
Original Filed April 1, 1964    22 Sheets-Sheet 8
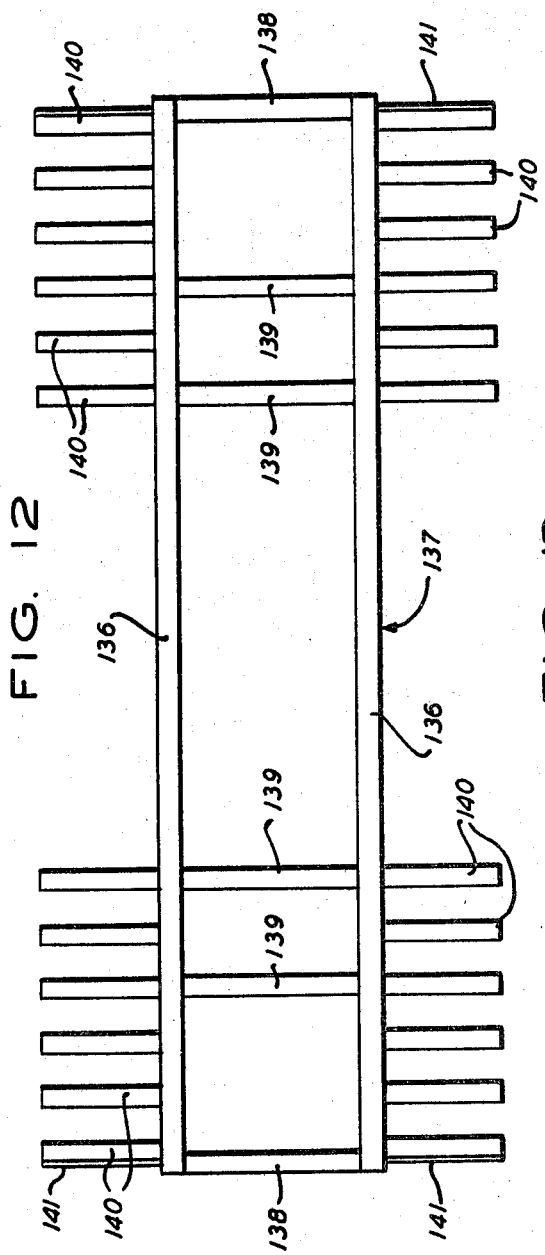
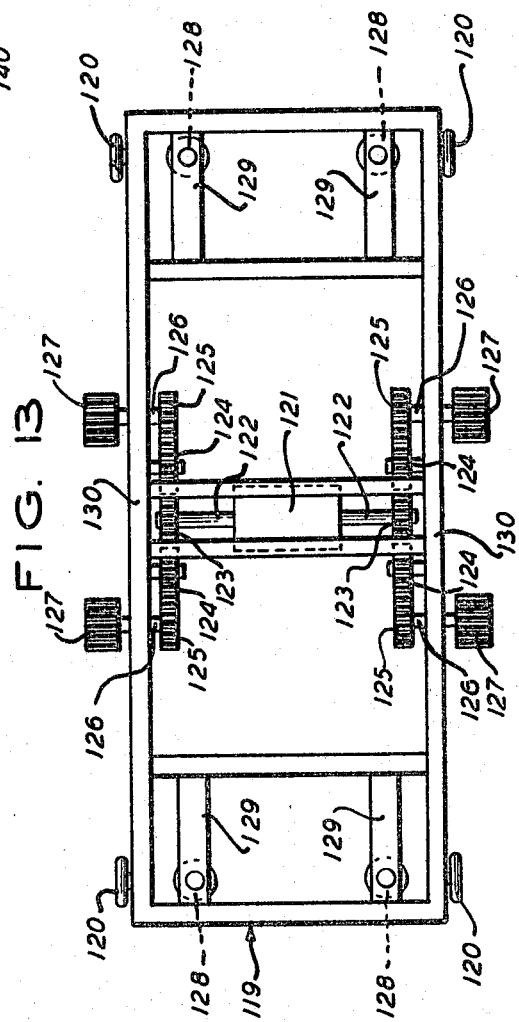
INVENTOR.
WILLIAM W. BALDWIN   C. DANA McCOY
MILTON BODIN    LEON ZINN
BY
ATTORNEY

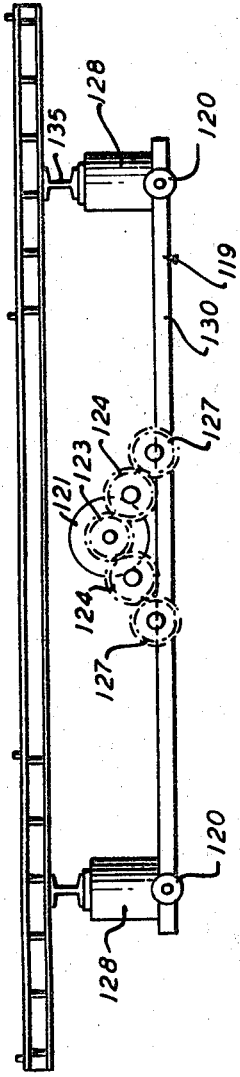
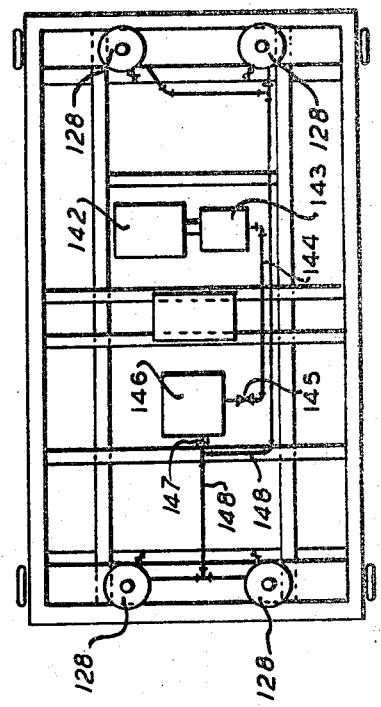
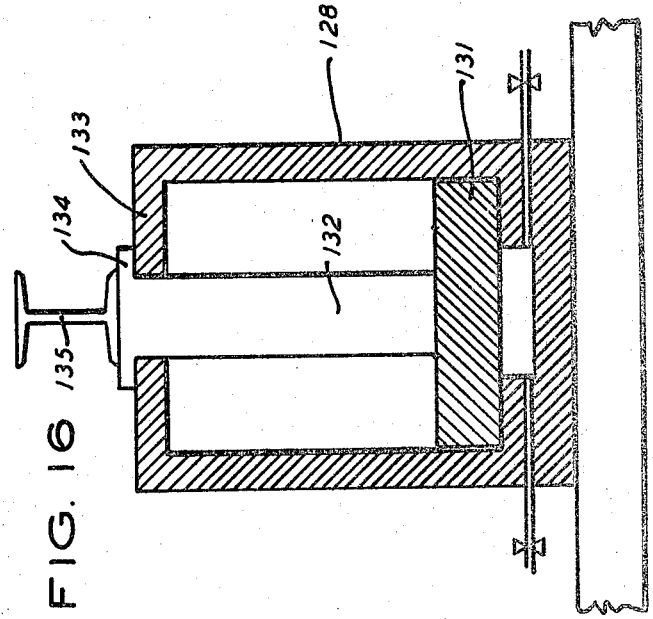

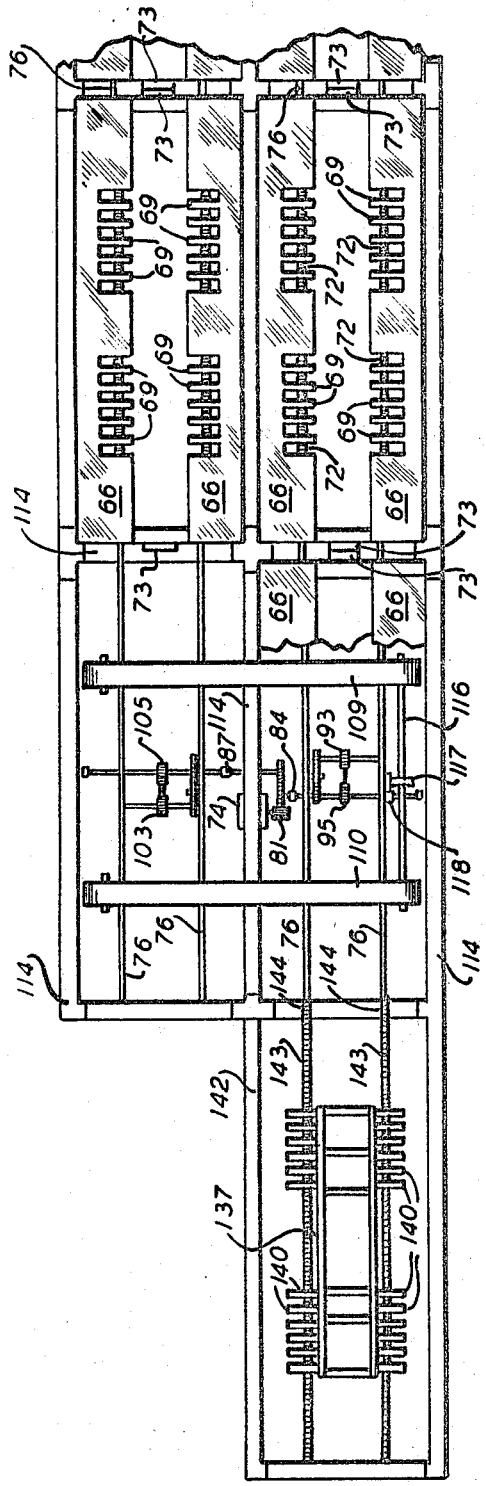
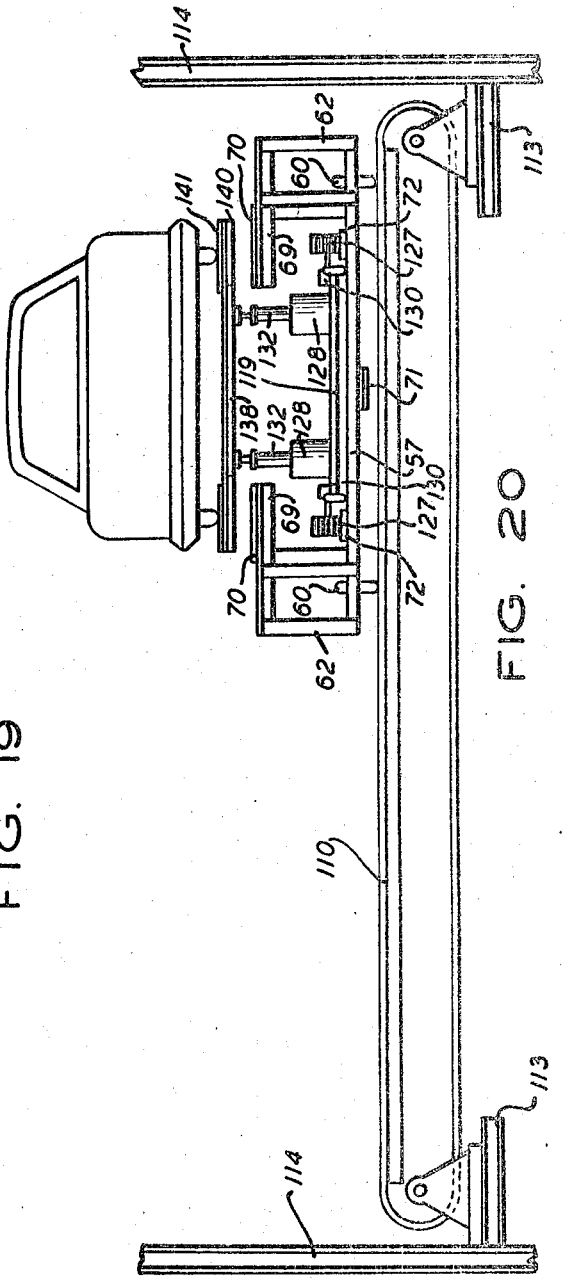

INVENTOR.
WILLIAM W. BALDWIN
C. DANA McCOY  LEON ZINN
MILTON BODIN
BY

ATTORNEY

INVENTOR.
WILLIAM W. BALDWIN  LEON ZINN
C. DANA McCOY  MILTON BODIN
BY
ATTORNEY

July 2, 1968  W. W. BALDWIN ET AL  3,390,791
PALLET APPARATUS FOR AUTOMATICALLY PARKING VEHICLES
Original Filed April 1, 1964  22 Sheets-Sheet 19

INVENTOR.
WILLIAM W. BALDWIN  C. DANA McCOY
MILTON BODIN  LEON ZINN
BY
ATTORNEY

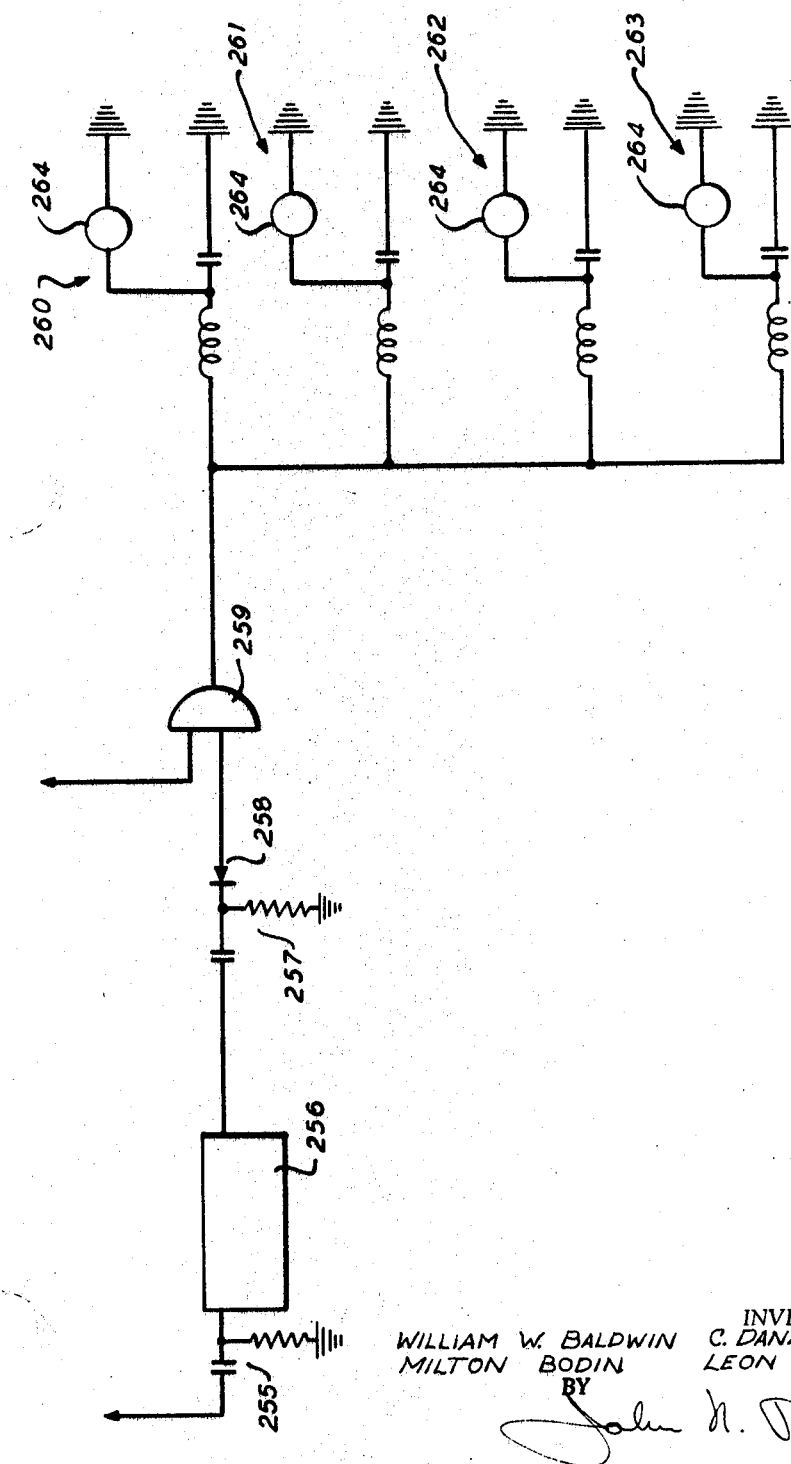

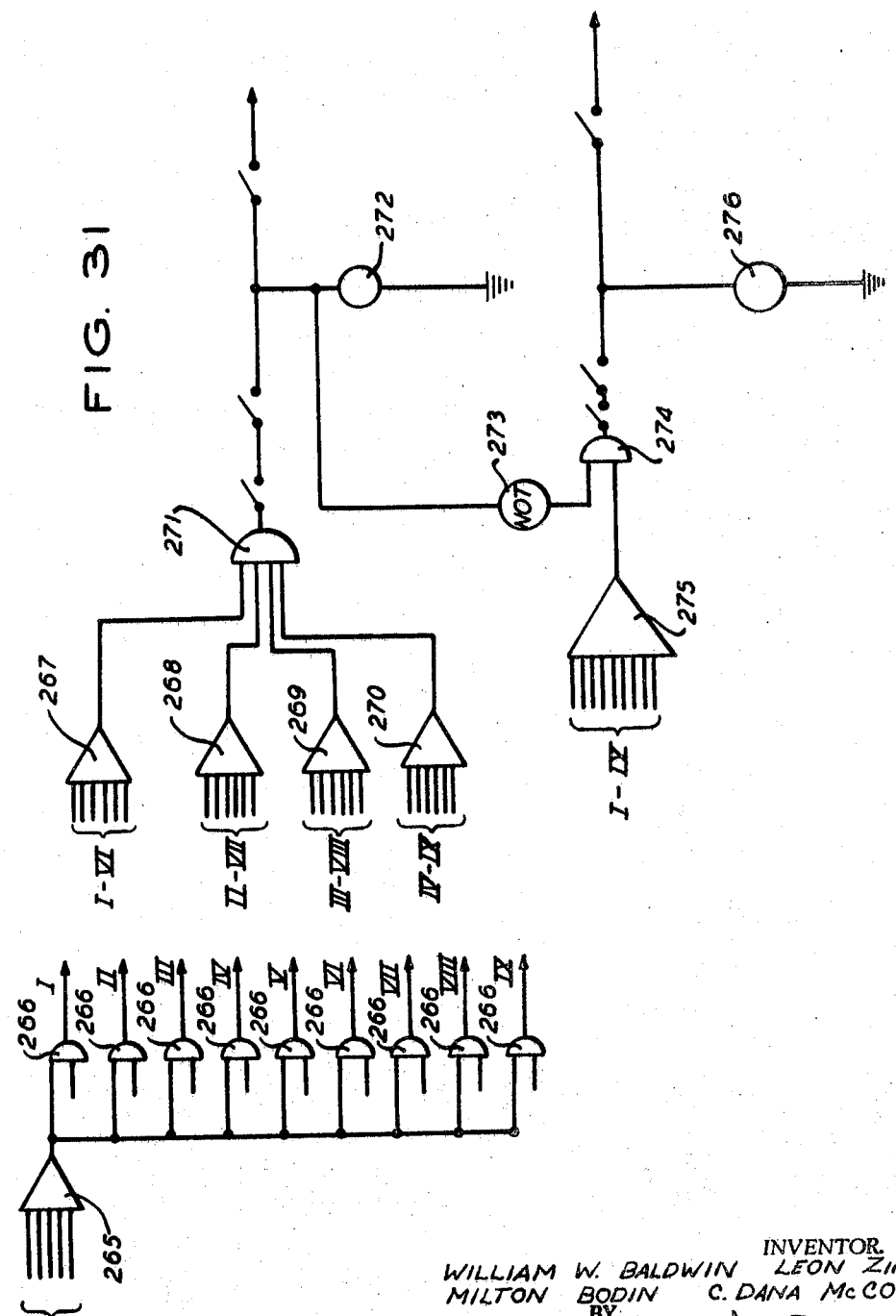

United States Patent Office 3,390,791
Patented July 2, 1968

3,390,791
PALLET APPARATUS FOR AUTOMATICALLY
PARKING VEHICLES
William W. Baldwin, 45 East End Ave., New York, N.Y.
10028; C. Dana McCoy, 1054 Barnegat Lane, Mantoloking, N.J. 08738; Milton Bodin, 176 Copley Ave.,
Teaneck Township, Bergen County, N.J. 07666; and
Leon Zinn, 8 Circle Drive, Syosset, N.Y. 11791
Continuation of application Ser. No. 356,417, Apr. 1,
1964. This application Apr. 4, 1966, Ser. No. 544,656
2 Claims. (Cl. 214—38)

Our invention relates to material handling generally and specifically to apparatus and methods for rapid, automatic automobile parking and live warehousing employing optimum space utilization in low cost structures of the ramp or elevator variety and particularly adaptable for high rise vertical structures utilizing in many instances inexpensive and a readily obtainable stock or inventory parts and materials. This is a continuation of our pending application, Ser. No. 356,417 filed Apr. 1, 1964.

Throughout the world and in particular in the United States, the twentieth-century phenomenon of the megatropolis is rapidly developing. Heretofore, urban areas have been well-defined and relatively small as compared to either a state or a region. However, today, the tendency toward centralization of both population and industry is obliterating the well-defined city replacing it by a densely populated generally urbanized national region. It is no longer possible for either the population or industry to migrate toward an uncrowded suburban or rural areas; since to do so would be to leave the region altogether. Hence, land has now become perhaps our most precious natural resource, and land values have accordingly increased enormously.

In cities such as New York where land has always been limited, city planners, architects and engineers have long adopted the solution of vertical, high-rise construction. However, today, even in areas of land plenty, such as Los Angeles, high-rise construction is becoming more popular. In many large cities throughout the United States laws require houses, apartments, office buildings, warehouses, factories and the like to provide sufficient parking facilities within the confines of their premises to reasonably accommodate vehicles used in connection with the structure. In Los Angeles, for instance, apartment houses must provide at least one parking space per apartment.

A further problem arises in connection with travel terminals and shopping centers. There is an ever increasingly greater trend toward mass rapid public transit in and about the heart of the urban area. However, it is desirable to permit the use of the automobile from the residence to a terminal area to connect with the rapid transient systems. Today, parking terminals such as the New York Port Authority terminal in Manhattan are common. Moreover, the large international airport presents an acute problem of motor vehicle handling. Most transportation to the large international airports, which invariably lie well beyond the heart of the urban area, is by motor vehicle. While land has heretofore been what similar situation since these centers, by their very nature, lie long distances from the heart of urban areas and frequently within suburban or rural-suburban areas. Here too, most travel to and from the shopping center is by motor vehicle. While land has heretobefore been relatively cheap in these remote areas, the development of the megatropolis has vastly increased the value of the land thereabout. Moreover, parking lots have become so large that additional transportation must be provided from the lot to the terminal or store. Such a condition of multiple changes in transportation means from home or business to destination is an absurdity.

Parking terminals today fall generally into one of three categories: the multi-story, standard elevator structure, the pigeon-hole gantry elevator structure and the multilevel ramp structure. In each of these systems, there is an inordinate waste of available space. In fact, the ramp garage generally requires such a large land area as to be uneconomical or totally infeasible in extremely crowded areas.

The multi-story elevator system and the pigeon-hole system require many attendants, thus enormously increasing labor costs. While the multi-story standard elevator system is feasible in a high-rise structure, usually each elevator is unduly loaded and, therefore, increases enormously the time for both parking and recovering vehicles. Moreover, each vehicle must be driven by an attendant onto the elevator, moved to the proper floor, and driven off of the elevator through an aisle which represents space unusable for parking, and, thereafter, parked. If vehicles are parked in such a manner as to use all of the available space, recovery becomes all but impossible.

The pigeon-hole parking garage is perhaps the most modern system. However, in such systems employing an overhead crane type of elevator, the structure is limited to approximately six floors and requires a costly staff of attendants. Moreover, as in the case of the common, high-rise elevator parking garage, there are inordinate delays in delivery of vehicles due to overloading of the elevator.

One of the most modern pigeon-hole type garages has been constructed on W. 43rd St. in New York City. This system employs two separately operable crane or gantry-type elevators which lift the vehicle to the desired pigeon-hole and deposit it onto the shelf. This system supports the vehicle by a cantilever extended beyond the base of the gantry. Obviously, such gantries are extremely large and complex resulting in very high capital costs. Moreover, this type of gantry is subject to malfunctions. With a garage of the type constructed in New York City, aforesaid, having but two gantries, should there be a malfunction in one gantry, the vehicles serviced by that gantry cannot be recovered until repairs are made.

In addition to the disadvantages set forth above relative to existing garage systems, there is an additional disadvantage from the fact that no known system can accommodate for varying sizes of vehicles. Today, considerably more than 50% of the vehicles which can be expected to come into a garage can be classified as the small or compact variety. These vehicles require substantially less parking space than do larger vehicles. Yet none of the known parking systems can accommodate for these differences in sizes and utilize efficiently the space so made available. To the contrary, each parking space must be made the same size as well as sufficiently large to accommodate the largest vehicle.

Broadly, our method of handling materials and vehicles in particular, comprises placing each vehicle upon a carrier or pallet. The carriers or pallets are positioned in two parallel aisles or lines on which the pallets abut end to end. The pallets are movable longitudinally in either direction along each aisle and transversely from aisle to aisle in either direction at the end of each aisle. The two aisles of pallets comprise a single parking unit. However, in each parking unit, at least one vacant space is provided equal to the size of one pallet. In garages employing long aisles of cars we preferably provide a vacant space in each aisle which would reduce by one-half the time required for sequence of movement without increasing the speed or acceleration of the pallets. Drive means are provided in each aisle to move the pallets longitudinally and separate drive means provided at the end of each aisle to move the pallets transversely. The parking unit, therefore, comprises a closed rectangular circuit having one open space, in which the pallets are movable in either direction, both longitudinally and transversely. A pallet in any position may, therefore, be moved to any other position.

A second aspect of our method for material handling comprises the loading of vacant pallets in the parking unit. As a vacant pallet reaches the loading station a separate, self-powered loader carrying a vehicle rides onto the vacant pallet, deposits the vehicle thereon and drives off the pallet in a series of controlled, sequenced motions. Unloading of a vehicle from the pallet is accomplished by the reverse procedure.

Our present invention contemplates both the use of a pallet movement control system within the closed parking unit circuit together with the loading and unloading mechanism or separately without the loading and unloading mechanism. For instance, the loading and unloading mechanism need not be employed in ramp-type garages whereas it is expeditious to employ the loading system in multi-story elevator garages.

In addition, our invention contemplates the use of our basic closed circuit parking unit system in a wide variety of arrangements with and without elevators and loaders.

In order to practice our methods aforesaid, we have invented a movable vehicle carrier or pallet, a drive system for moving the pallets longitudinally in either direction along each aisle, a pallet transfer system adopted to move the pallets in either direction transversely from aisle to aisle at each end thereof and a loader adapted to cooperate with each pallet to load and unload vehicles therefrom. In addition, we have devised novel electromechanical and electronic control systems for automatically operating the pallet drive and transfer mechanisms in coordination with the loader when the same is employed and elevators which may be employed to carry the loader from floor to floor.

Therefore it is among the objects and advantages of our invention to provide apparatus and methods for automatically parking vehicles employing a minimum floor area for each vehicle.

Another object of our invention is to provide apparatus and methods for automatically parking vehicles in which the vehicle may be deposited upon a loader by either the customer or an attendant and thereafter be automatically moved to and from remote parking positions in multi-story buildings without again being touched by the customer or an attendant.

Yet another object of our invention is to provide apparatus and methods for automatically parking vehicles in which the vehicle is placed upon a longitudinally movable carrier or pallet in a generally rectangular, closed circuit of pallets.

Still another object of our invention is to provide apparatus and methods for automatically parking vehicles employing an automatically controlled parking unit comprising a plurality of longitudinally movable pallets arranged in two generally parallel aisles end to end, the pallets being transversely movable between the aisles at each end thereof by reason of one or more vacant spaces in the circuit.

Still another object of our invention is to provide apparatus and methods for automatically parking vehicles in which the pallets we arranged in long ranks, side by side, the pallet being movable longitudinally along the ranks and transversely between the ranks at the ends thereof.

Still yet another object of our invention is to provide apparatus and methods for automatically parking vehicles requiring paid attendants only at the points of entry and exit of the vehicles from the terminal.

A further object of our invention is to provide apparatus and methods for automatically parking vehicles which is adaptable to multi-level elevator structures as well as multi-level ramp structures.

Yet a further object of our invention is to provide apparatus and methods for automatically parking vehicles employing mass formations of parking units automatically operated thereby eliminating the need for pedestrian aisles.

Still yet a further object of our invention is to provide apparatus and methods for automatically parking vehicles in which movable pallets ride upon structural elements of the building such as steel beams eliminating the need for load-bearing floors thereby enormously reducing the cost of the structure.

Another object of our invention is to provide apparatus and methods for automatically parking vehicles in which the reduced weight of the terminal structure permits the construction of buildings having a greater overall height and a larger number of individual levels than could be tolerated for the usual terminal garages employing load-bearing floors particularly important in areas having relatively low soil bearing capacity.

Yet still another object of our invention is to provide apparatus and methods for automatically parking vehicles which may be adapted for installation in a wide variety of existing buildings such as lofts, warehouses and the like employing relatively inexpensive freight elevators.

Still another object of our invention is to provide apparatus and methods for automatically parking vehicles in which parking units of movable pallets may be interspersed between ordinary freight elevators reducing the number of vehicles which each elevator must handle thereby permitting rapid parking and recovery of each vehicle without delay occasioned by overburdened elevator use.

Yet a further object of our invention is to provide apparatus and methods for automatically parking vehicles employing movable pallets arranged in closed parking unit circuits, which pallets and circuits can be specifically constructed for use with vehicles of different size thereby obtaining maximum use of available floor area.

A further object of our invention is to provide apparatus and methods for automatically parking vehicles employing pallets which may be either structurally altered or physically interchanged to accommodate for automobiles of different sizes.

Yet still a further object of our invention is to provide apparatus and methods for automatically parking vehicles which can employ approximately 90% of the entire floor parking area for actual parked vehicles and which can be arranged to more than double the parking capacity attainable in even the best designed ramp garages suitable for customer self-parking.

Another object of our invention is to provide apparatus and methods for automatically parking vehicles in which a loader automatically carries a vehicle from a loading station, either on a floor or on an elevator onto a movable pallet, discharges the vehicle onto the pallet and thereafter, withdraws from the pallet automatically and without moving the center of gravity of the vehicle outside of the bearing base of the loader.

A further object of our invention is to provide apparatus and methods for automatically parking vehicles employing a pallet which is provided with front and rear couplers adapted to engage and disengage it from adjacent pallets and which is periodically engageable with drive means located beneath the pallet on the building structure.

Yet another object of our invention is to provide apparatus and methods for automatically parking vehicles employing an electromechanical or electronic control system which automatically removes the vehicle from the entrance platform, transports it to a pallet in a parking unit, and thereafter recovers the vehicle from the pallet transporting it to an exit station.

Still another object of our invention is to provide apparatus and methods for automatically parking vehicles in which the control system employs readily obtainable, relatively low cost constituent parts arranged and employed in a novel fashion.

Yet another object of our invention is to provide apparatus and methods for automatically parking vehicles in which the control system is simple enough to be operated by untrained personnel.

Yet a further object of our invention is to provide apparatus and methods for automatically parking vehicles which employs, for the most part, standard industrial components which are readily obtainable and which can be assembled and installed, as well as serviced, by personnel having ordinary skill in the art.

Yet still another object of our invention is to provide apparatus and methods for automatically parking vehicles which is adaptable to live warehousing wherein it is necessary to handle material, moving it from one place to another or moving it to and from storage facilities and providing live storage, assembly lines, packaging, marking, sorting and inspection lines.

Still another object of our invention is to provide apparatus and methods for automatically parking vehicles which employs simple, well-known parts requiring little or no maintenance at little cost.

Yet another object of our invention is to provide apparatus and methods for automatically parking vehicles which is adaptable for loading and unloading warehouses, ships, docks, piers, supply lines, shopping centers and the like.

These objects and advantages as well as other objects and advantages may be achieved by our invention which is illustrated in the drawings in which:

FIGURE 2a is a schematic plan view of the street level of a multilevel garage showing our system installed in a typical loft building;

FIGURE 2b is a schematic plan view of a typical upper floor layout of the building shown in FIGURE 2a;

FIGURE 4b is a schematic plan view of the upper level of a crane-type pigeon-hole garage installed in the building shown in FIGURE 4a;

FIGURE 5a is a schematic plan view of an upper floor of a pigeon-hole garage presently located on 57th Street in New York City;

FIGURE 5b is a schematic plan view of the same floor area as shown in FIGURE 5a employing our system;

FIGURE 5c is a schematic plan view showing an alternative arrangement of a typical upper floor level employing our system in the same area provided in FIGURES 5a and 5b;

FIGURE 10 is an end elevational view of the pallet drive system;

FIGURE 11 is a top plan view of the vehicle carrier or pallet drive system shown in FIGURE 10;

FIGURE 12 is a top plan view of a vehicle loader with the bottom frame portion thereof broken away;

FIGURE 13 is a bottom plan view of the loader frame with the top portion broken away;

FIGURE 14 is a side elevational view of the loader shown in FIGURES 12 and 13;

FIGURE 15 is a top plan view of the loader frame showing the elevator compressor system and having the top frame and the drive system removed;

FIGURE 16 is a side elevational cross-sectional view of a pneumatic jack employed in the loader to raise the top frame;

FIGURE 19 is a top plan view of a portion of a two aisle parking unit showing the pallet movement system and a loader poised upon an elevator adjacent to the end of one aisle;

FIGURE 20 is an end elevational view of a loader carrying a vehicle riding on a pallet which is, in itself, resting on a pair of pallet transfer belts;

FIGURE 23b is the remainder of the circuit shown in FIGURE 23a. FIGURES 23a and 23b matching on points B—B on the respective plates;

FIGURE 30 is an electrical circuit diagram of a motor acceleration and deceleration control system;

FIGURE 31 is an electrical circuit diagram for an alternative motor acceleration and deceleration control system;

Figures 1A, 1B, 1C, 1D:
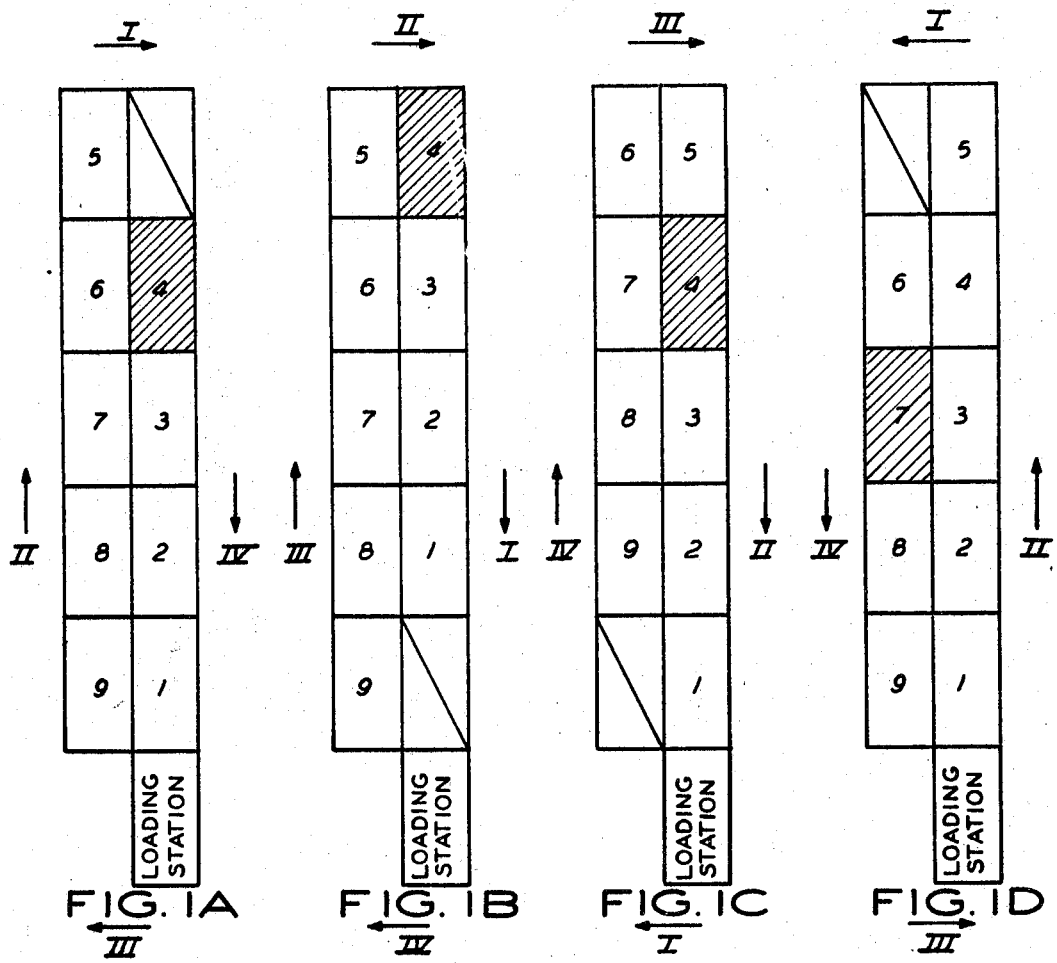
FIGURES 1a, 1b, 1c and 1d are schematic plan views of a typical, rectangular, closed circuit parking unit depicting the sequence of movement in order to move a vehicle from particular positions in a parking unit to a position adjacent to an elevator.
Figure 9:
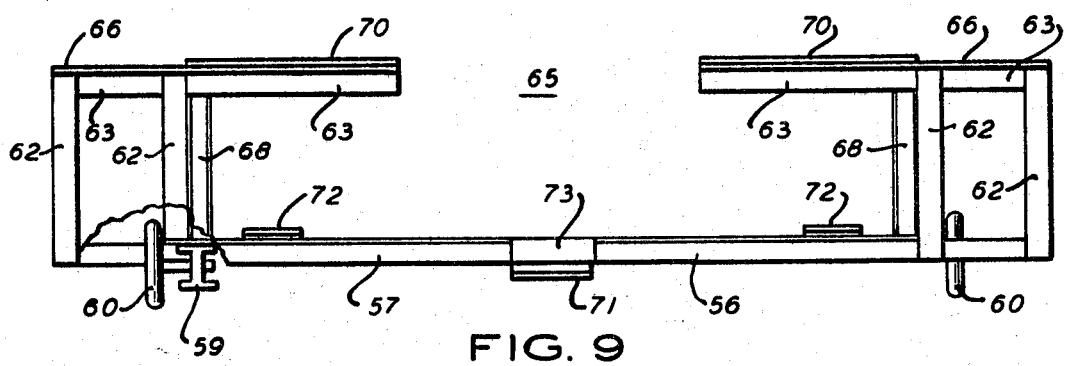
FIGURE 9 is an end elevational view of the vehicle carrier or pallet shown in FIGURES 7 and 8.

Referring now to the drawings in detail, our method contemplates the use of movable vehicle carriers or pallets. The pallets are arranged in a plurality of parallel aisles or lines, the pallets abutting each other end to end along each aisle. There is defined by two aisles, a closed circuit of pallets abutting each other end to end with at least one empty space at the end of an aisle equivalent to the size of one pallet. During movement of the pallets in either a clockwise or counter clockwise direction, the empty space changes its position in the closed circuit but always remains at one end of one of the respective aisles.

A loading station is positioned adjacent to at least one of the pallet positions at the end of an aisle or in the center of the circuit. Periodically, the empty space in the circuit appears adjacent to the loading station.

Our method comprises transferring a vehicle from the loading station to an empty pallet positioned adjacent to the loading station, the pallet being in the closed circuit. The pallets are movable in either direction along the aisles and transversely from aisle to aisle in either direction at the ends of the aisles. In order to move the pallets around the closed circuit, the following sequence of movements is employed: the pallet, at the end of one aisle adjacent to the empty space, which always lies at the end of the opposite aisle, is moved transversely to occupy the said empty space, thereby leaving an empty space in the position from which it moved; the pallets in the aisle now having an empty space at its end are simultaneously moved longitudinally in the direction of the empty space until the empty space at the opposite end of that aisle; the pallet in the opposite aisle adjacent to the empty space is then moved transversely to occupy that empty space creating an empty space at the end of the said opposite aisle; thereafter, the pallet in the said opposite aisles are simultaneously moved longitudinally to occupy the empty space thereby creating an empty space at the opposite end of that aisle. Each pallet has thus progressed one position in the circuit and a new pallet is now adjacent to the loading station.

Our method also contemplates the loading and unloading of vehicles from the pallet at the loading position by placing a vehicle on a movable loader, moving the loader onto the pallet adjacent to the loading station, transferring the vehicle from the loader to the pallet and moving the loader from the pallet into the loading station again. This sequence of movements is accomplished by a loader having a vertically movable platform upon which the vehicle is supported. The loader is adapted to ride from the loading position onto the pallet with the vehicle in a raised position above a supporting platform on the pallet. The supporting platform on the loader continues to descend below the level of the supporting platform on the pallet and thereafter, the loader moves from the pallet back into the loading station.

Many arrangements of pallet circuits are conceivable with loading stations located on the periphery of the circuit or within the circuit. FIGURES 1a through 1d schematically illustrate a typical closed circuit of pallets defining a single parking unit having a loading station, marked as such located at the end of one of the aisles. In FIGURE 1a, each of the numbered squares designates a vehicle on a pallet. The loading station is adjacent to vehicle number 1 at the bottom of the right hand aisle. The square at the top of the right-hand aisle, having a diagonal line, represents a vacant space. In order to bring vehicle number 4, cross-hatched for clarity, to the loading station in the minimum number of moves, the sequence is as follows: Vehicle number 5 is moved transversely to the right into the vacant space as indicated by the arrow designated I; vehicles 6, 7, 8, and 9, in the left hand aisle, are simultaneously moved upwardly as indicated by the arrow II so that vehicle 6 occupies the empty space heretofore occupied by the vehicle 5; thereafter, vehicle 1 is moved transversely from the right hand aisle to the left hand aisle into the vacant space created by movement of vehicle 9 into position of vehicle 8, as indicated by the arrow III; thereafter, vehicles 2, 3, 4 and 5 now in the right hand aisle are simultaneously moved downwardly in accordance with the arrow marked IV so that vehicle 2 moves into the position heretofore occupied by vehicle 1 and left vacant by the movement of vehicle 1 into the position of vehicle number 9. Vehicle number 4 has now moved downwardly in the right hand aisle into the position heretofore occupied by vehicle 3. The same sequence is employed twice more to bring vehicle 4 to the position initially occupied by vehicle 1 and adjacent to the loading station.

FIGURE 1b shows an identical parking unit wherein the empty space is initially opposite the loading station and desired vehicle 4 is at the top of the right hand aisle. In order to obtain vehicle number 4 adjacent to the loading station, a sequence as shown in Roman numerals by the arrows is employed. First vehicles 1, 2, 3, and 4 are simultaneously moved downwardly until vehicle 1 occupies the space initially empty opposite the loading station creating an empty space at the top of the right hand aisle. Then vehicle 5 at the top of the left hand aisle is moved transversely to the right to occupy the newly created empty space at the top of the right hand aisle. Then, vehicles 6, 7, 8 and 9 are simultaneously moved upwardly until vehicle 6 occupies the now empty space heretofore occupied by vehicle 5 creating an empty space where vehicle 9 was initially positioned. Then, vehicle 1, now in the position adjacent to the loading station is moved transversely to the left to occupy the empty space initially occupied by vehicle 9 creating an empty space again opposite the loading station. This sequence is repeated three more times to bring vehicle 4 to a position immediately adjacent to the loading station.

FIGURE 1c shows another identical parking unit wherein the vacant space is initially at the end of the aisle diagonally opposite the loading station. In order to obtain vehicle 4, the sequence shown by the Roman numerals and arrows is employed. Vehicle number 1 is moved transversely into the empty space at the bottom of the left hand column. Thereafter, vehicles 2, 3, 4 and 5 are simultaneously moved downwardly until vehicle 2 occupies the space left empty by the movement of vehicle 1. Then vehicle 6 is moved transversely to the right to occupy the empty space created by movement of vehicle 5 downwardly into the position initially occupied by vehicle 4 leaving an empty space at the top of the left hand aisle. Finally, vehicles 1, 9, 8 and 7 are simultaneously moved upwardly until vehicle 7 occupies the space initially occupied by vehicle 6. Vehicle 4 has now moved downwardly in the right hand aisle to occupy the space initially occupied by vehicle 3. The sequence is repeated twice more until vehicle 4 occupies the position initially occupied by vehicle 1 and is adjacent to the loading station.

FIGURE 1d illustrates another parking unit in which the vacant space is initially at the top of the left-hand aisle. In order to obtain vehicle number 7 adjacent to the loading station, the sequence shown in Roman numerals and arrows is employed. Vehicle number 5 is first moved transversely to the left to occupy the empty space at the top of the left hand aisle creating an empty space at the top of the right hand aisle. Vehicles 1, 2, 3 and 4 are then simultaneously moved upwardly until vehicle 4 occupies the empty space at the top of the right hand aisle created by the movement of vehicle 5 to the left. Thereafter, vehicle 9 is moved transversely to the right to occupy the space initially occupied by vehicle 1 and left vacant by the movement of vehicles 1, 2, 3 and 4 upwardly for one full space. Finally, the vehicles 5, 6, 7 and 8 are simultaneously moved downwardly in the left hand aisle until vehicle 8 occupies the space initially occupied by vehicle 9 thereby creating a vacant space again at the top of the left hand aisle. This sequence is repeated twice more to bring vehicle 7 to the position occupied initially by vehicle 1 and adjacent to the loading station.

It should be noted that the sequence of movements is always alternately transverse, then longitudinal, then transverse and finally again longitudinal. Whether the first movement is longitudinal or transverse depends upon the position of the vehicle sought and the empty space. While the direction of movement in FIGURES 1a, 1b, and 1c is clockwise about the closed circuit, the direction of movement in FIGURE 1d is counterclockwise. Whether or not the movement is clockwise or counterclockwise depends upon the initial position of the desired vehicle, the desired vehicle always taking the shortest route to the loading station. However, in each sequence, the movement is always in one direction, either clockwise or counterclockwise, depending upon the initial direction of movement.

FIGURES 2a and 2b illustrate a typical loft building designed to accommodate our parking system; FIGURE 2a being the ground level and FIGURE 2b being a typical upper level.

Referring to FIGURE 2a, the garage comprises a pair of entrances 11 and 12 on a city street, the entrances 11 and 12 respectively lead into entrance and exit vestibules 13 and 14 separated by a combination stairwell and passenger elevator shaft 15.

Each of the entrance rooms 13 and 14 are provided with an opening respectively 16 and 17 at their rear. The openings 16 and 17 are adapted to admit a vehicle to a turntable, respectively, 18 and 19. The turntables 18 and 19 are each immediately adjacent to a freight elevator respectively 20 and 21. The loader device is positioned upon each of the elevators 20 and 21 and are adapted to receive a vehicle which may be driven from the turntable onto the loader. A vertical dividing wall 22 divides the loft building into two vertical chambers 23 and 24.

FIGURE 2b illustrates the manner in which the vehicles may be parked in the upper levels of the building employing our methods and devices. The building is divided by the wall 22, into two parking units per level. The elevators 20 and 21 pass vertically upwardly through the center of each closed parking unit. Thus, each level is provided with two closed parking circuits. Each circuit can accommodate seven vehicles arranged in two parallel aisles, the ends of each aisle being separated by a single pallet. Thus, each closed circuit comprises three pallets, in length arranged end to end, and three pallets in width arranged side to side with the central space equivalent to the size of one pallet empty to accommodate the freight elevator 20 or 21. Of course, each circuit is provided with one empty space respectively 25 and 26. The operation of each circuit is closely analagous to the operation of the circuits illustrated in FIGURES 1a through 1d. The elevators 20 and 21 may be boarded from, respectively, positions D and G in the left hand circuit, and positions K and H in the right hand circuit. For instance, if one desires to obtain vehicle E at the elevator 20, the sequence is as follows: Vehicles E and F are moved downwardly along the right hand aisle of the left hand circuit until vehicle E occupies the empty space 25. Thereafter, vehicles A and G are simultaneously moved transversely until vehicle G occupies the now empty space initially occupied by vehicle F. Thereafter, vehicles C and B are moved upwardly until vehicle 2 occupies the space initially occupied by vehicle A and now empty, thereby rendering the space initially occupied by vehicle C vacant. Finally, vehicles E and D are moved transversely to the left until vehicle E is positioned in front of elevator 20. As in the case of the arrangements shown in FIGURES 1a through 1d, the movement is alternately transverse and longitudinal or longitudinal and transverse, depending upon the location of the vacant space when the sequence begins.

Figure 3:
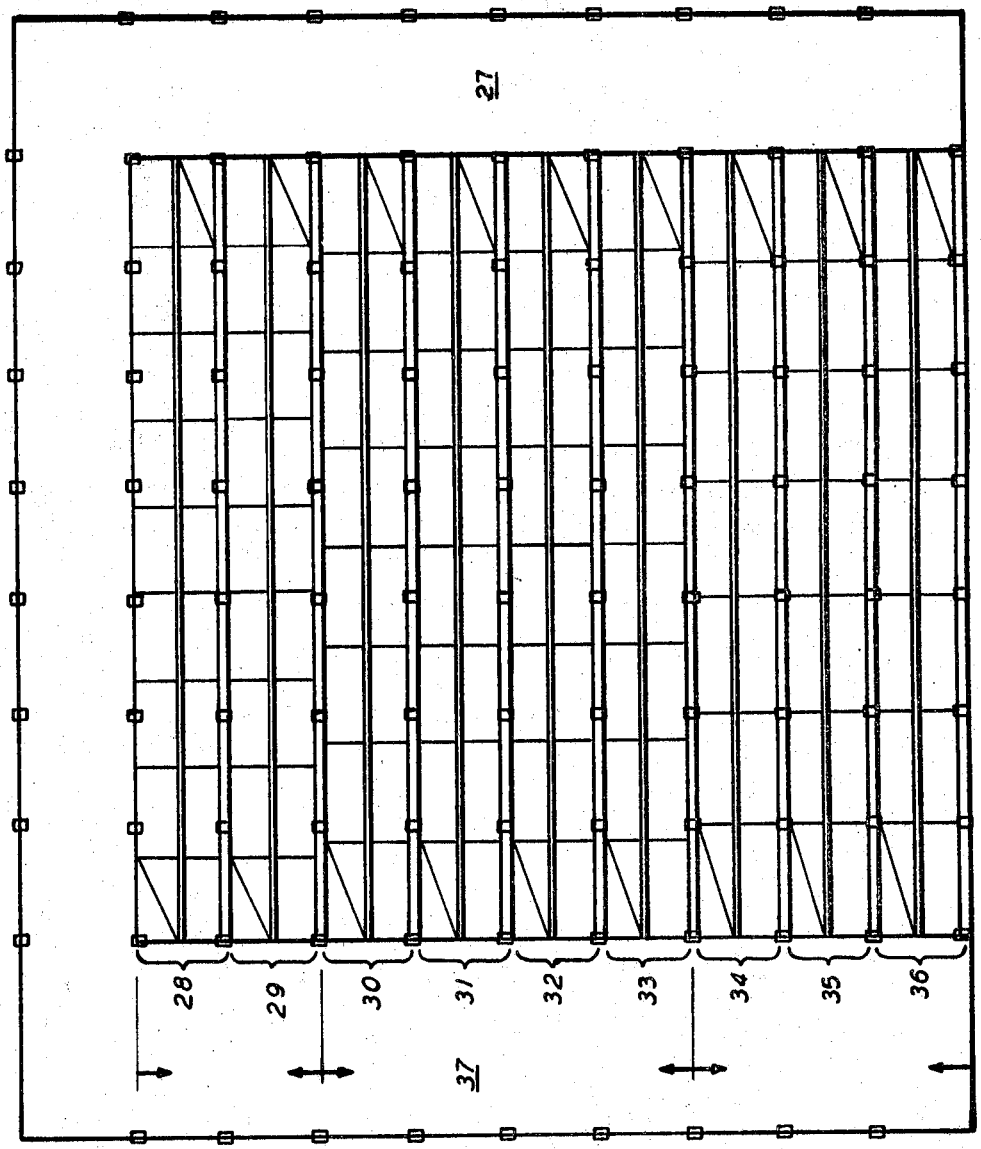
FIGURE 3 is a schematic plan view of an upper floor layout in a typical ramp or elevator building employing our methods and apparatus.

FIGURE 3 illustrates a multi-level parking garage arrangement employing our methods and apparatus. There is illustrated an upper level which is provided with nine closed circuit parking units. The parking level may be reached by a ramp 27 or, in the alternative, by a plurality of ordinary freight elevators. The two closed circuit parking units 28 and 29, at the upper-most portion of the drawing, comprise two aisles each of nine pallets spaces. Assuming an overall building level area of two hundred feet by one hundred and sixty-five feet, units 28 and 29 are adapted to hold 32 relatively small vehicles up to 15 feet seven inches long each.

The next four units 30, 31, 32 and 33 comprise two aisles each having space for eight pallets in each aisle. Thus parking units 30, 31, 32 and 33 collectively, can accommodate 56 medium sized vehicles up to a length of 17 feet 6 inches.

The remaining parking units 34, 35 and 36, comprise two aisles each having space for seven pallets in each aisle. Thus, units 34, 35 and 36 can accommodate 36 relatively large vehicles up to twenty feet in length. A corridor 37 is provided adjacent to the ends of the respective parking units 28 through 36 inclusive. This corridor 37 can be made 35 feet in width, sufficient to handle any vehicle which may be driven up ramp 27 or discharged thereon by means of a freight elevator. The customer drives his vehicle onto an empty pallet which will be positioned immediately adjacent to the corridor 37 and leaves the vehicle there. Automatically, the particular parking unit onto which the vehicle is driven goes through a sequence of movements to bring an additional empty pallet to a loading position immediately adjacent to corridor 37.

When the customer desires to recover his vehicle, he approaches the particular parking unit in which his car was placed from ramp 27, the opposite side. Automatically, by means of a control system to be hereinafter described, the parking unit is sequenced to bring this particular vehicle to a position immediately adjacent to ramp 27. Whereupon, the customer will enter his vehicle, drive it off the pallet into the ramp 27 and from thence out of the building. It is possible to arrange entry of the vehicle onto the floor level so that vehicles being parked pass only through corridor 37 and vehicles being discharged pass only through the opposite ramp 27 so that at no time do vehicles move in opposite directions, thereby greatly reducing danger to vehicle and customer. In addition, this greatly speeds up both delivery and recovery of the parked vehicle. Still further, the customer need never walk through, in front of or behind massed vehicles, some of which may be in the process of being parked or recovered. This is a necessity in almost every other garage found today and is extremely dangerous. The particular design shown in FIGURE 3 is for a ramp garage and provides spaces for one hundred and twenty four vehicles or an increase of 90% over parking garages employing other systems in exactly the same space. If automatic elevators were provided for this particular type of arrangement, still more vehicles could be accommodated on each level.

Figure 4A:
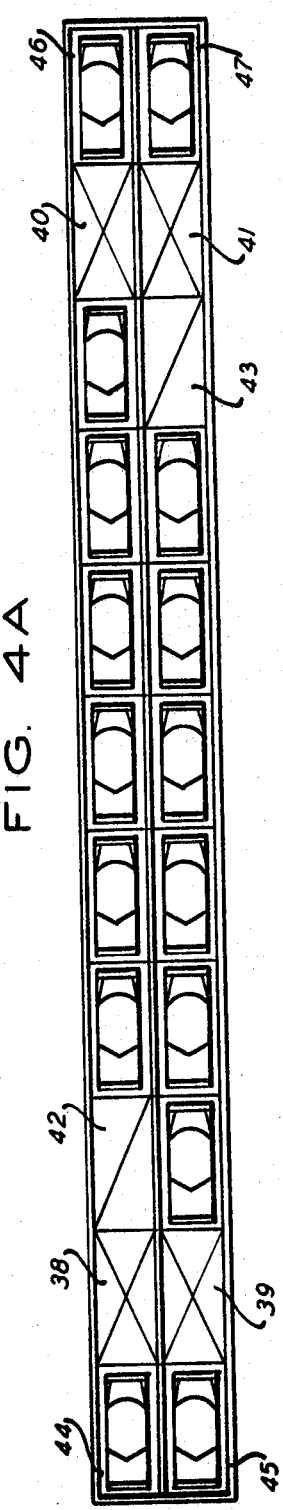
FIGURE 4a is a schematic plan view of an upper floor layout in a typical pigeon-hole type garage structure employing our apparatus and methods.
Figure 4B:
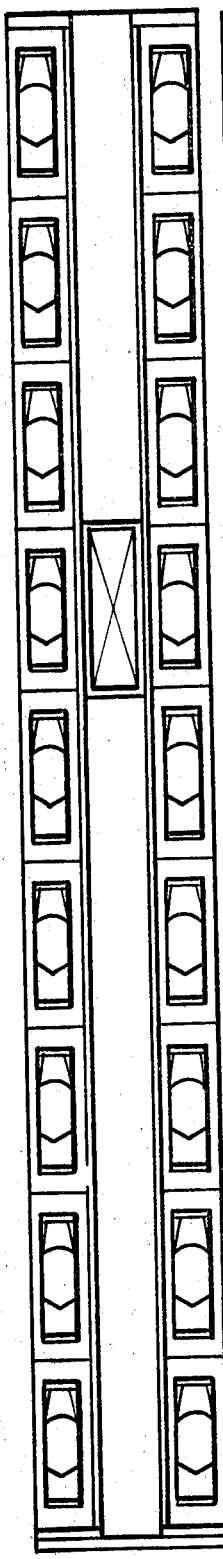

FIGURE 4a illustrates an automated pigeon-hole type garage employing our methods and apparatus whereas FIGURE 4b illustrates a garage using another well-known pigeon-hole parking system. In a pigeon-hole garage employing our methods and apparatus, a single, closed circuit parking unit is employed. The parking units comprises two generally parallel longitudinal aisles having seven pallet spaces each. Four common freight elevators 38, 39, 40 and 41 are employed, one at each end of each aisle. However, in this particular circuit, two vacant pallet spaces are employed, respectively 42 and 43. The vacant spaces, 42 and 43 equally divide the unit, six vehicles on each side of each vacant space. In addition, single, immovable parking spaces 44, 45, 46 and 47 are employed adjacent to each of the elevators on the opposite side from the closed circuit parking unit.

If it is assumed that the overall length of the parking level is 200 feet and the overall width is 17 feet, the arrangement shown in FIGURE 4a can accommodate 16 medium sized vehicles employing, therefore, 212½ square feet per vehicle.

By way of comparison, the well-known pigeon-hole parking system shown in FIGURE 4b is able to accommodate only 18 vehicles in a building which is 200 feet in length but which must be 30 feet in width. This system requires 333 square feet per vehicle and is obviously very wasteful of space. In addition, the single crane or gantry type elevator employed is extremely expensive and the vehicle load per elevator substantially greater than that in the garage illustrated in FIGURE 4a employing our methods and apparatus. It can be observed easily that a garage as illustrated in FIGURE 4a can accommodate 32 vehicles per level in little more than the area occupied by the garage shown in FIGURE 4b which accommodates only 18 vehicles. Moreover, the garage shown in FIGURE 4a employs simple, inexpensive freight elevators rather than the complex and expensive crane or gantry type elevator employed in the garage shown in FIGURE 4b. This is extremely important since, if the single elevator in the well-known parking system shown in FIGURE 4b were to malfunction, there would be no way of either parking or recovering vehicles. To the contrary, in our garage shown in FIGURES 4a, even if three of the four elevators were to malfunction, the fourth elevator could handle all of the vehicles parked.

We have found that it is advantageous to limit the elevator handling load to approximately 80 vehicles, thus, in a garage such as is shown in FIGURE 4a, three hundred and twenty large vehicles could be accommodated in twenty levels in vertical alignment. Twenty levels would be virtually impossible in the common pigeon-hole system shown in FIGURE 4b. Actually, the crane or gantry type elevator should not be used for more than about 6 levels.

In FIGURE 5a, a typical upper level floor layout is illustrated for a garage having the same floor space and overall dimensions as that now existing on W. 57th St. in New York aforesaid employing our methods and apparatus. In the arrangement shown in FIGURE 5b, six ordinary freight elevators are employed to accommodate six closed circuit parking units comprising two generally parallel aisles having four pallet units in each aisle and a single vacant space. Thus, each unit is adapted to accommodate seven vehicles or 42 vehicles per floor level. It is feasible to accommodate 504 vehicles in 12 levels served by 6 conventional elevators representing one elevator for each 84 vehicles. Such an elevator handling load permits rapid service. The operation of each parking unit is identical to that described for FIGURES 1a through 1d. This arrangement results in an overall increase of 40% over the garage shown in FIGURE 5a.

FIGURE 5c shows still another pigeon-hole garage employing the same type of building as that shown in FIGURES 5a and 5b employing our methods and apparatus. In this arrangement, four closed circuit parking units, respectively 48, 49, 50 and 51 are employed with four elevators, 52, 53, 54 and 55. However, the arrangement of each unit is somewhat different than the arrangements shown in the foregoing figures. In this particular arrangement the pallets are arranged in two ranks, side by side, rather than aisles end to end. Each unit comprises 7 pallets spaces in each aisle with a vacant space in each aisle symmetrically dividing the pallets. One aisle of each parking unit can be serviced by two elevators. The manner and sequencing of movements of the pallets in the respective units and the loading and unloading is analogous in every respect to the system hereinbefore described. The sequence is always alternately transverse and longitudinal or longitudinal and transverse. However, longitudinal movement and transverse movement occurs simultaneously in each aisle but in the opposite direction. In the garage shown in FIGURE 5c, 352 vehicles can be accommodated in 8 levels served by four conventional freight type elevators, thus, maintaining a ratio of 88 vehicles per elevator which is approximately one-half of the elevator handling load of the well-known garage shown in FIGURE 5a.

Figure 6:
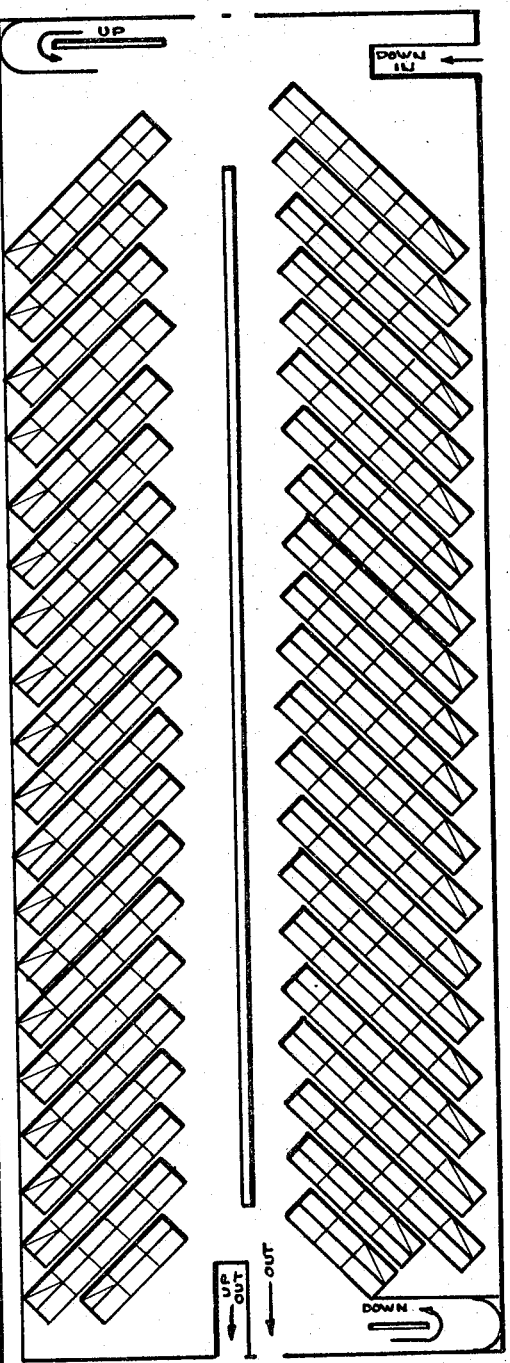
FIGURE 6 is a schematic plan view of a partially automatic ramp garage employing our system.
Figure 7:
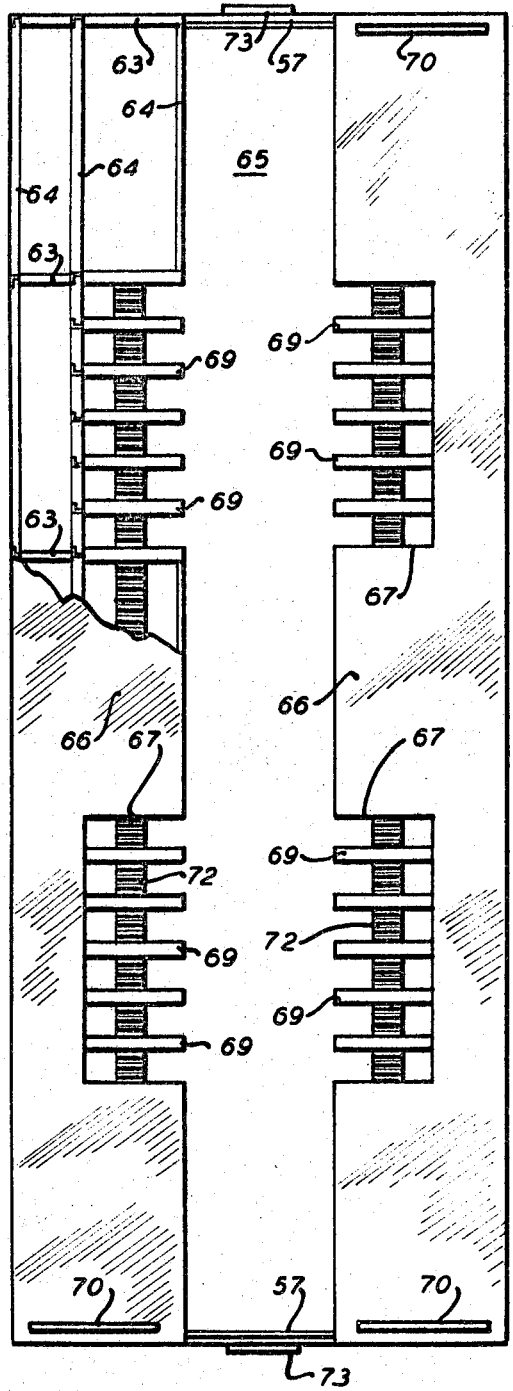
FIGURE 7 is a top plan partially broken away view of a vehicle carrier or pallet.
Figure 8:
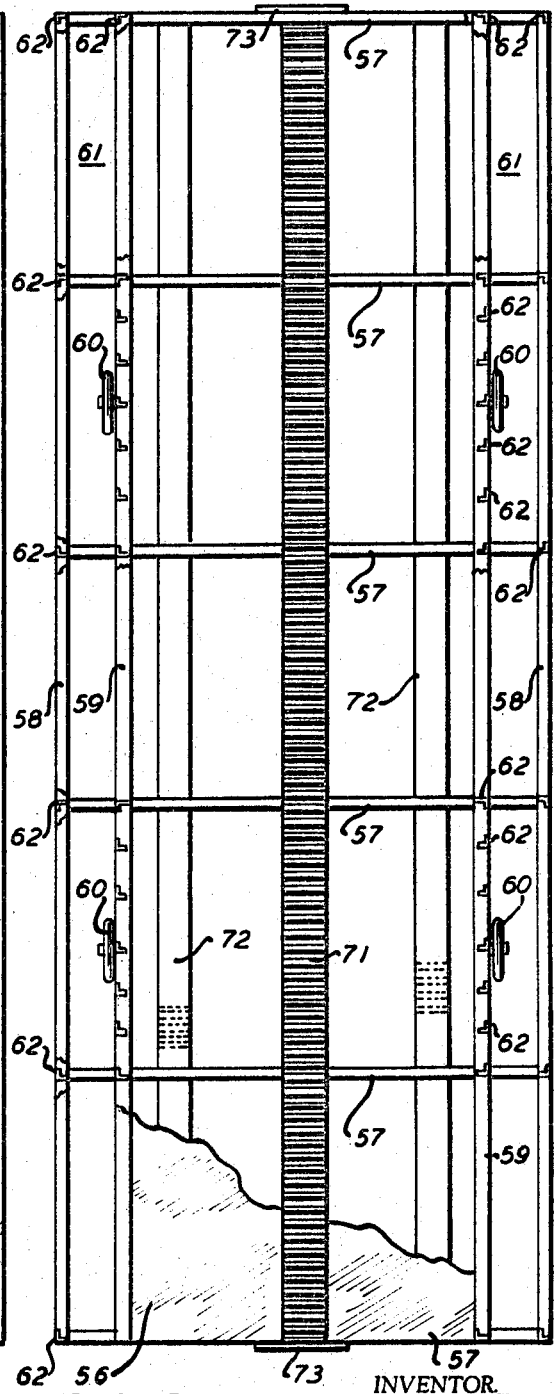
FIGURE 8 is a bottom plan view of the vehicle carrier or pallet shown in FIGURE 7.

FIGURE 6 illustrates a ramp garage employing a plurality of our closed circuit parking units positioned at a 45 degree angle to the side of the building. By arranging each parking unit at 45 degrees to the longitudinal wall of the building, the customer can enter and depart from his vehicle without standing in back of another vehicle which may be departing, thereby reducing the danger of pedestrian injury. The customer drives up a ramp and down one of two vehicle corridors 561 and 571 separated by a pedestrian walk 581. The vehicle is driven onto a vacant pallet which is always positioned in the right hand aisle of each parking unit. The discharge position in each unit is at the bottom of the left hand aisle. Thus, even if vehicles were being parked and recovered from adjacent parking units simultaneously, the customer would not be compelled to stand in back of the vehicle being removed from the adjacent unit. Moreover, the central pedestrian walk 581 avoids the necessity of the customer walking in an aisle through which cars are moving. In this particular layout, a parking capacity of 450 vehicles can be realized in each level. This, is equal to 240 more vehicles than can be provided by an ordinary well-known angled parking system in a ramp garage. This particular garage must be 604 feet in length and 227 feet in width. Parking units A through G are adapted to accommodate 73 relatively large vehicles up to 20 feet in length. The remaining parking units on that side of the pedestrian walk 581 are adapted to accommodate 156 relatively small vehicles up to 16 feet in length. The opposite side of the garage is adapted to handle 221 vehicles of medium length up to 18 feet long. This demonstrates how our method and apparatus can be adjusted to accommodate vehicles of varying sizes with an optimum degree of space efficiency.

Even greater space efficiencies can be obtained in the same floor area if the respective parking units are positioned at 90° to the longitudinal walls of the building. However, hazards to customers from moving vehicles are increased in such a layout.

Many more configurations and arrangements of parking units employing our basic methods and apparatus may be devised. However, the foregoing figures illustrate some of the basic modifications possible when employing our methods and apparatus and some of the space savings realized thereby. As has been seen, the strategic positioning of ordinary freight elevators makes possible extremely high rise structures employing each level's floor area with a maximum degree of efficiency without inordinately increasing the elevator handling load. Thus, a vastly increased number of vehicles can be accommodated in a limited space with extremely rapid service.

Our invention contemplates the use of a vehicle carrier or pallet which is adapted to support and move a vehicle in our closed circuit parking unit. Each pallet is provided with a rotatable bearing support members such as wheels, ball bearings, roller bearings, or the like that ride on structural members of the buildings as distinguished from load bearing floors. The pallets are moved longitudinally along each aisle of the parking unit by means of a drive system mounted on structural members of the building and engaging one pallet at a time as it passes the drive means. Pallets not actually in engagement with the drive means are either pulled or pushed by the pallet which is in engagement with the drive means. Thus, each pallet is provided with coupling means on both ends.

A pallet suitable for large automobiles is approximately 20 feet in length and 7 feet 4 inches in width, and the base 56 may be conveniently formed of 20 gauge steel plate. A plurality of generally L-shaped structural cross-members 57 are secured to the base 56 transverse to its longitudinal axis and equally spaced between its ends. A pair of elongated generally L-shaped longitudinal structural members 58, 58 form the bottom longitudinal sides of the pallet and are secured to the ends of the respective cross-members 57 and to the base 56. A pair of generally parallel I-beams 59, 59 are mounted to the bottom of the base 56 and depend therefrom. The I-beams 59, 59 are parallel to the longitudinal axis of the pallet and are adapted to mount wheels 60, 60, 60, 60 upon which the pallet rides. The wheels 60, 60, etc. are mounted upon the outside edge of the I-beams 59, 59 and extend downwardly beneath the level of the base 56 and transverse cross-members 57. It should be noted that the base 56 extends only between the I-beams 59, 59 thereby leaving a vertically open space 61 between the I-beams 59 and the longitudinal structural member 58 opposite to it.

A plurality of vertical, generally L-shaped structural members 62, 62 etc. are secured to the cross-members 57 and the longitudinal members 58, extending upwardly therefrom. Secured across the tops of the respective vertical members 62 are top transverse members 63 and top longitudinal members 64. However, the top transverse members 63 do not extend across the pallet but rather are divided into two segments leaving a longitudinal opening 65 positioned symetrically about the longitudinal axis of the pallet. A pair of top, vehicle support plates 66, 66 cover the ends of the vertical members 62 and the top transverse member 63 and longitudinal member 64 on each side of the opening 65. Each of the plates 66, 66 is provided with a pair of generally rectangular openings 67, 67 etc. separated from each other along the length of the plate and communicating with the opening 65. A plurality of vertical, wide-flange beams 68, 68 etc. are mounted on the base plate 56 above the respective beams 59, 59 extending upwardly toward the top support plates 66, 66 within the opening 67, 67 etc. A plurality of horizontal, transverse wide-flange beams or ribs 69, 69 etc. are mounted on the respective tops of the vertical beams 68 extending into the opening 67, 67 etc. in the respective vehicle support plates 66, 66 terminating at the longitudinal opening 65. The beams 68, 68 etc. and the beams 69, 69 etc. mounted thereon are equally spaced apart from each other within the opening 67, 67 etc. Ribbed car stops 70, 70 etc. are positioned transverse to the longitudinal axis of the pallet on opposing ends of the respective opening 67, 67 etc.

A continuous rack gear 71 is mounted on the bottom of the base plate 56 parallel to and symmetrically about the longitudinal axis of the pallet. This rack gear is adapted to mesh with drive means mounted to the building which will be more fully described hereafter. In addition, a pair of continuous rack gears 72, 72 are mounted on top of the base plate 56 extending parallel to each other and parallel to and symmetrically about the longitudinal axis of the pallet. The rack gears 72, 72 are positioned between the respective vertical support beams 68, 68 but outside of the longitudinal opening 65 between the vehicle support plates 66, 66. The rack gears 72, 72 are adapted to facilitate movement of the loader onto and off the pallet which will be more fully described hereafter.

A typical pallet may be fabricated of steel plate, angle irons, I-beams and wide-flange beams which may be purchased as shelf or stock items.

The rectangular opening 67, 67 etc. are four feet in length and positioned four feet from each end of the pallet. Thus, the openings are adapted to engage the four wheels respectively of the vehicle positioned thereon and are so dimensioned and positioned as to accommodate a wide variety of vehicles having different wheel bases and widths.

Our pallet drive system comprises basically an electrically driven gear which is adapted to mesh with the continuous rack gear 71 on the bottom of the pallet. Only one pallet at a time is engaged with the drive system, the pallets preceding and succeeding the driven pallet being connected thereto by connectors 73 on each end of each pallet. In the alternative, a mechanical coupling may be provided on each end of the pallet which disengages as the pallet moves transversly and re-engages as the pallet passes into registration with the pallet in the adjacent aisle.

FIGURES 10 and 11 illustrate a typical drive system for our pallets. The pallets are assumed to lie in two generally parallel aisles comprising a single, closed circuit parking unit. A motor 74 is supported by a base 75 which is secured to structural members of the building, in FIGURE 10 shown as wide flange beams 76, 76 by means of a pair of threaded connecting rods 77, 77 attached to the bottom flange of each beam by means of clamps 78, 78. The motor 74 is preferably mounted on the base 75 by means of vibration eliminating mounts 79.

The motor 74 is provided with a power output shaft 80 which has a worm gear 81 on its end. The worm gear 81 is meshed with and drives a larger gear 82 keyed to the power input shaft 83 of a magnetic clutch 84. Gear 82 is also meshed with a still further gear 85 keyed to a power input shaft 86 of a second magnetic clutch 87.

The power output shaft 88 of the magnetic clutch 84 is keyed to a spur gear 89. Spur gear 89 is meshed with an idler gear 90 which in turn is meshed with two separate spur gears 91 and 106. Spur gear 91 is keyed to a drive shaft 92 having a pinion gear 93 keyed thereto. The drive or pinion gear 93 meshes with rack 71 on one of the pallets.

Spur gear 106 is keyed to a shaft 94 to which a second pinion gear 95 is keyed which is adapted to also engage rack 71 on the bottom of the pallet. A third shaft 96 is connected to the pinion gear 95 on the side opposite shaft 94 and is connected to a magnetic brake 97. Spur gear 85, meshed in driving relationship to the power output shaft 80 of motor 74, is coupled through shaft 86 to a second magnetic clutch 87. The power output shaft 98 of magnetic clutch 87 is keyed to a spur gear 99. Spur gear 99 meshes with an idler gear 100 which in turn is meshed with two separate spur gears 101 and 107. Spur gear 107 is keyed to a drive shaft 102 which is provided with a pinion gear 103 intermediate its ends.

In similar fashion, spur gear 101 is keyed to an output shaft 104 which has a pinion gear 105 keyed thereto. The opposite side of pinion gear 105 is connected to the power input shaft 106 of a magnetic brake 73. Pinion gears 103 and 105 mesh with a rack 71 on the bottom of a pallet immediately adjacent to the pallet engaged by pinion gears 95 and 93, the pallets lying in parallel aisles of a parking unit.

It should be borne in mind that shafts 94 and 96 may be a single unitary shaft as may shafts 104 and 106 on the opposite side of motor 74.

In operation, motor 75 rotates worm gear 81 which in turn drives gear 82 and 85. Pinion gear 82 is connected to shaft 83 which is connected to the power input side of magnetic clutch 84. In turn, spur gear 85 is connected through shaft 86 to the power input side of magnetic clutch 87. Magnetic clutches 84 and 87 are adapted to periodically engage and disengage thereby generating movement of the pallets in the respective aisles. However, shafts 83 and 86 rotate in opposite directions, hence the direction of movement of the respective pallets is opposite to one another. Movement of each pallet is generated by rotation of the pinion gears engaged to the racks 71 on its bottom. The magnetic clutches 84 and 87 are adapted to be reversible so that each pallet may move along its respective aisle in either direction. The respective pallets ride on wheels 60 which in turn ride upon structural members 76 of the building between flanges 108, 108 defining a channel or track, 111.

Figure 17:
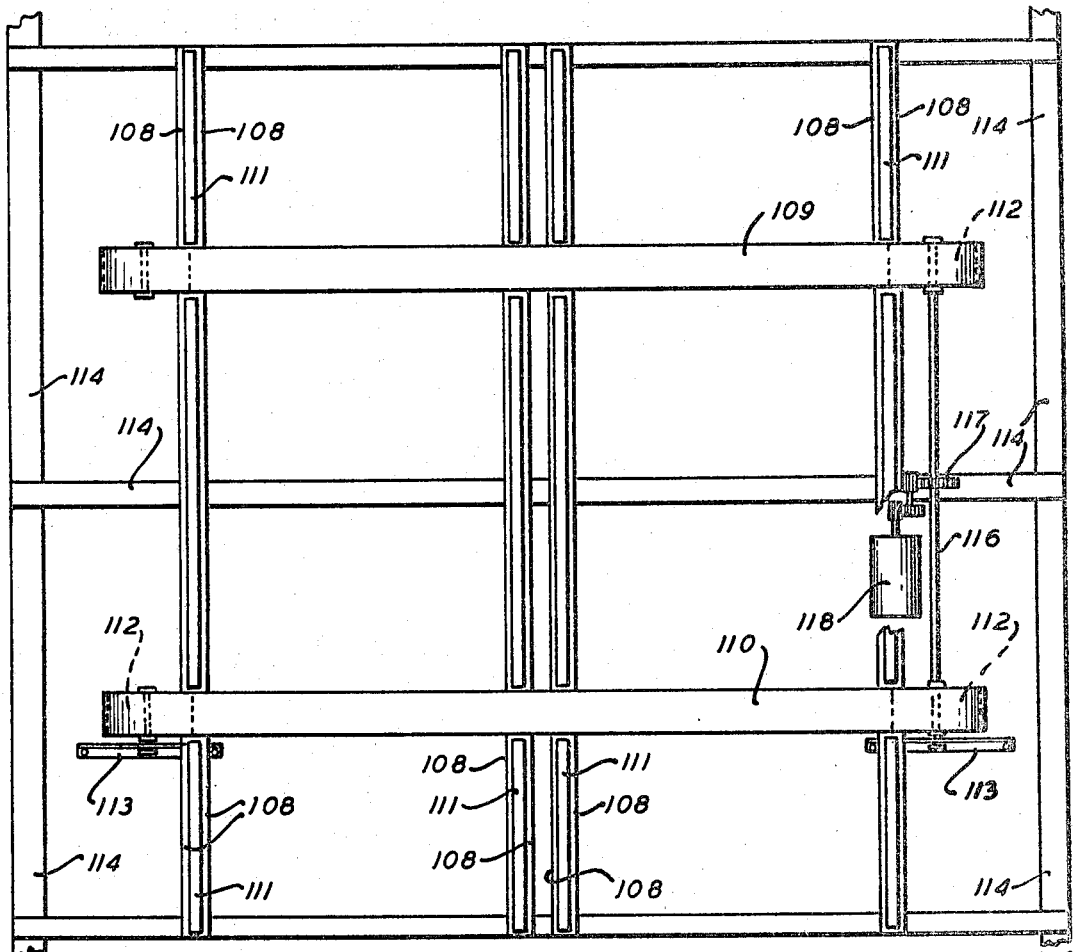
FIGURE 17 is a top plan view of the pallet transfer drive system at one end of a two aisle, closed circuit parking unit.
Figure 18:
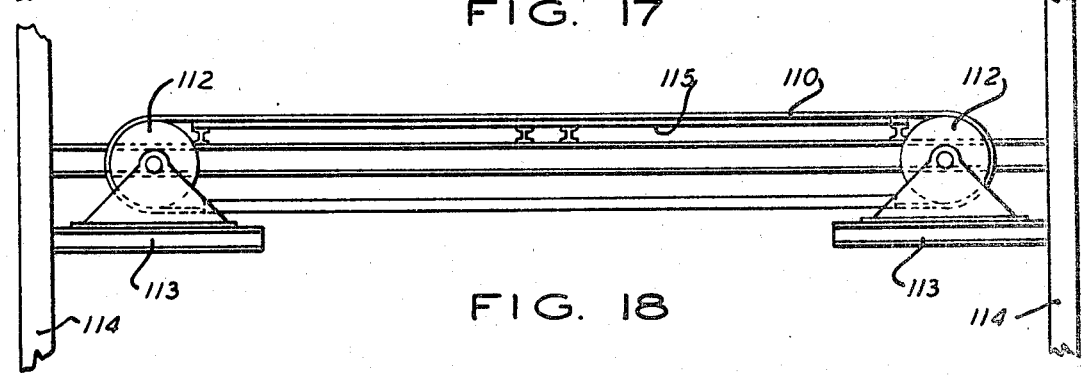
FIGURE 18 is a side elevational view of the transfer system shown in FIGURE 17.

FIGURES 10 and 11 illustrates the pallet longitudinal transport mechanism. FIGURES 17 and 18 illustrate the pallet transverse movement system located at the ends of the respective aisles. This transverse or cross-over motion is accomplished by a pair of continuous belts 109 and 110, which are spaced apart and positioned at right angle intercepting relationship to the flanges 108, 108 defining tracks 111. The belts 109 and 110 are separated by a distance equal to the wheel base of the respective pallets employed in the parking unit. The belts 109 and 110 are mounted on respective end drums 112, 112. The drums are each mounted on appropriate supports 113 secured to the building 114, 114. The upper transverse portion of the belts 109 and 110 lie in the same plane as the top of the building members 76, 76 upon which the wheels 60 of the pallets ride. The upper portion of each belt rides over a structural support 115 mounted to the building 114. The drums 112, 112 on one side of the respective belts 109, 110 are connected through a common shaft 116 to a gear 117. Gear 117 is connected through an appropriate geared transmission to a motor 118.

The motor 118 rotates the gear 117 and shaft 116 thereby generating rotation of drums 112, 112 on one side of the respective belts 109, 110. Thus, belts 109 and 110 are simultaneously moved in the same direction. Of course, the direction of rotation of motor 118 may be reversed or a suitable transmission provided for reversing such motion.

In operation, the pallet rides through tracks 111, 111 to the belts 109, 110 at the end of the aisle. The wheels 60 of the pallet come to rest upon the belts 109, 110, the pallets straddling the belts. The belts are then simultaneously moved and the pallet resting thereon carried into the adjacent aisle from whence it can move longitudinally again through parallel tracks 111, 111.

FIGURES 12, 13, 14, 15 and 20 illustrate our loader mechanism. The loader comprises a generally rectangular base frame 119. The frame 119 is provided with wheels 120, 120 etc. at its respective corners. The frame 119 is adapted to move in the direction of its longitudinal axis on wheels 120.

A motor 121 is mounted generally centrally with respect to the frame 119. The motor 121 is provided with a pair of power output shafts 122, 122 generally perpendicular to the sides 130, 130 of the frame 119. Each shaft 122, 122 is provided with a pinion gear 123 at its end. Each pinion gear 123 is connected through appropriate idler gears 124, 124 to drive gears 125, 125. Each gear 125 is connected to a shaft 126 extending through the side member 130 of the frame 119. A drive gear 127 is keyed to the end of each shaft 126 beyond the side member 130.

Four pneumatic cylinders 128 are mounted, each upon a transversed supporting member 129 of the frame 119. In the alternative, the pneumatic cylinders may be hydraulic cylinders or mechanical jacks. Each pneumatic cylinder 128 is provided with a slidable piston 131 connected to a piston rod 132 which extends upwardly through the top 133 of the cylinder 128. The rod 132 is provided with a radio flange 134 at its top upon which a wide flange supporting beam 135 is mounted.

The four wide flange supporting beams 135 are secured to longitudinal side members 136 of a vertically movable upper frame 137. The side members 136, 136 are joined at their ends by transversed members 138, 138 and intermediate their ends by transverse structural supporting members 139, 139, etc.

A plurality of spaced ribs 140 are secured to the external sides of the side members 136 at their respective ends. An upturned flange 141 is provided on each of the end ribs 140 to prevent accidental movement of a vehicle from the ribs.

FIGURE 15 is a bottom plan view of the lower frame showing the pneumatic cylinder control system. An air compressor motor 142 is mounted on the frame 119. The motor 142 is connected to an air compressor 143 which is in turn connected through a suitable air pressure line 144 and a control valve 145 to an air pressure tank 146. The air pressure tank 146 is connected through an appropriate valve 147 and pneumatic lines 148, 148 etc. to the respective pneumatic cylinders 128. In FIGURE 15, the loader drive mechanism is not shown.

Figure 21A:
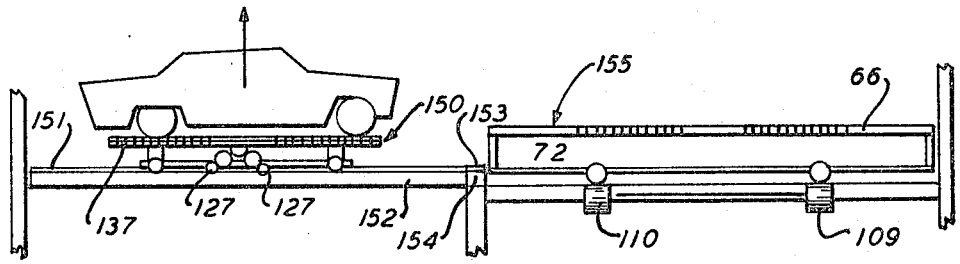
FIGURES 21a, 21b, 21c, 21d and 21e are schematic sequence views of the loader operation.

FIGURES 21a through 21e illustrate the sequence of movement of the loader while in operation. In FIGURE 21a, the loader rests upon a pair of parallel racks 151, 151 on an elevator 152. The elevator 152 is at such a level that racks 151, 151 abut complementary racks 153, 153 on building structural members 154 located between the elevator 152 and the pallet 155.

Racks 153, 153 abut racks 72, 72 on the base 56 of the pallet 155. The pallet 155 in turn rests upon crossover belts 109, 110. The drive gears 127, 127, etc. on the loader frame 119 are meshed with the respective racks 151, 151. The lifting platform 137 of the loader 150 is at its lowest position as the elevator 152 brings the racks 151 in registration with the racks 72, 72 of the pallet 155.

Figure 21B:
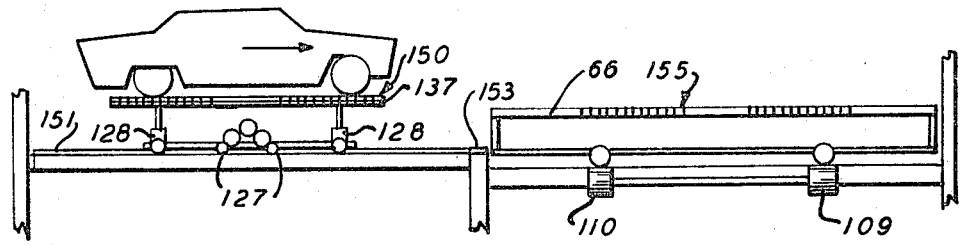
Figure 21C:
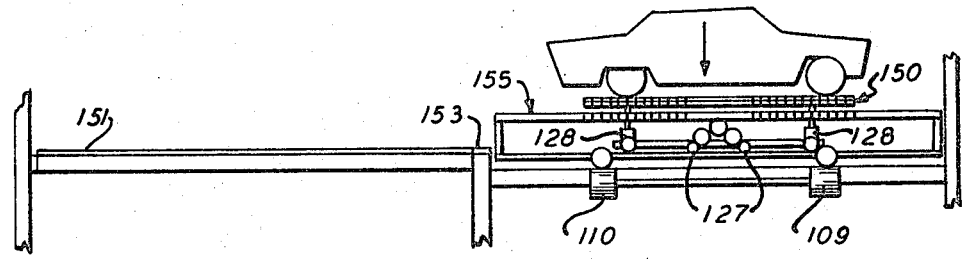
Figure 21D:
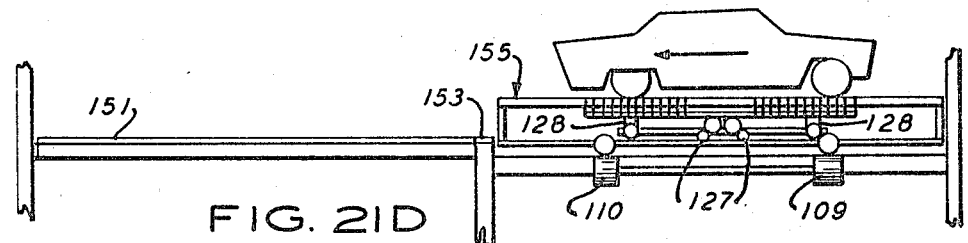
Figure 21E:
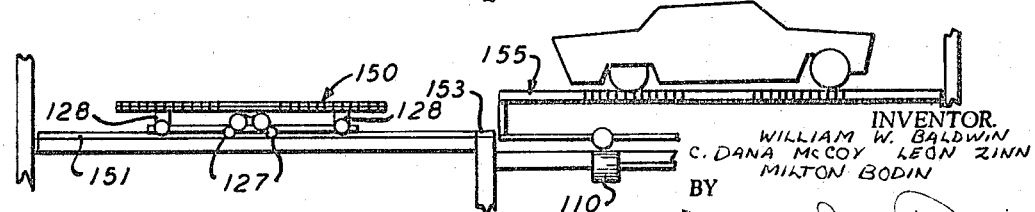

In FIGURE 21b the hydraulic or pneumatic jacks 128 are energized to raise the supporting platform 137 to its topmost position at a level above the level of the vehicle platforms 66, 66 of the pallet 155. The motor 121 adapted to energize drive gears 127 on a loader frame 119 is energized moving the loader 150 to the right onto the racks 151, 151 across racks 153, 153 and onto racks 72, 72 on the pallet 155. The shafts 32, 32 of the respective hydraulic or pneumatic jacks 128 lie within the confines of the rectangular opening 65 between the plates 66, 66 of the pallet 155. The loader is then brought to rest on the pallet 155 such that the ribs 140 of the upper frame 137 are in spaced registration with the ribs 69 on the pallet 155. The jacks 128, 128, etc. are then lowered so that the frame 137 of the loader descends, causing the ribs 140 thereon to pass between the ribs 69 of the pallet 155. As the ribs 140 of the loader pass between the ribs 69 on the pallet the car is transferred from the frame 137 of the loader to the pallet. The jacks 128 continue to lower the frame 137 of the loader until it is in a plane beneath the plane of the plates 66, 66 of the pallet 155.

Thereafter the motor 121 of the loader is re-energized in the opposite direction moving the loader to the left along the racks 72, 72 of the pallet onto the racks 153, 153 of the building and from thence on to racks 151, 151 of the elevator.

In order to recover a vehicle the opposite sequence of moves is performed. That is the frame 137 of the loader is lowered to its lowermost position. The loader is then driven onto the pallet, and the frame raised so that ribs 140 on frame 137 pass between ribs 69 on the pallet. The car is then transferred from the pallet 155 to the ribs 140 on the loader frame 137. The loader frame 137 continues to rise until it lies in a plane above the plane of the plates 66, 66 of the pallet. Then the drive motor 121 of the loader is re-energized in the opposite direction moving the loader from the pallet onto the elevator.

Figure 22A:
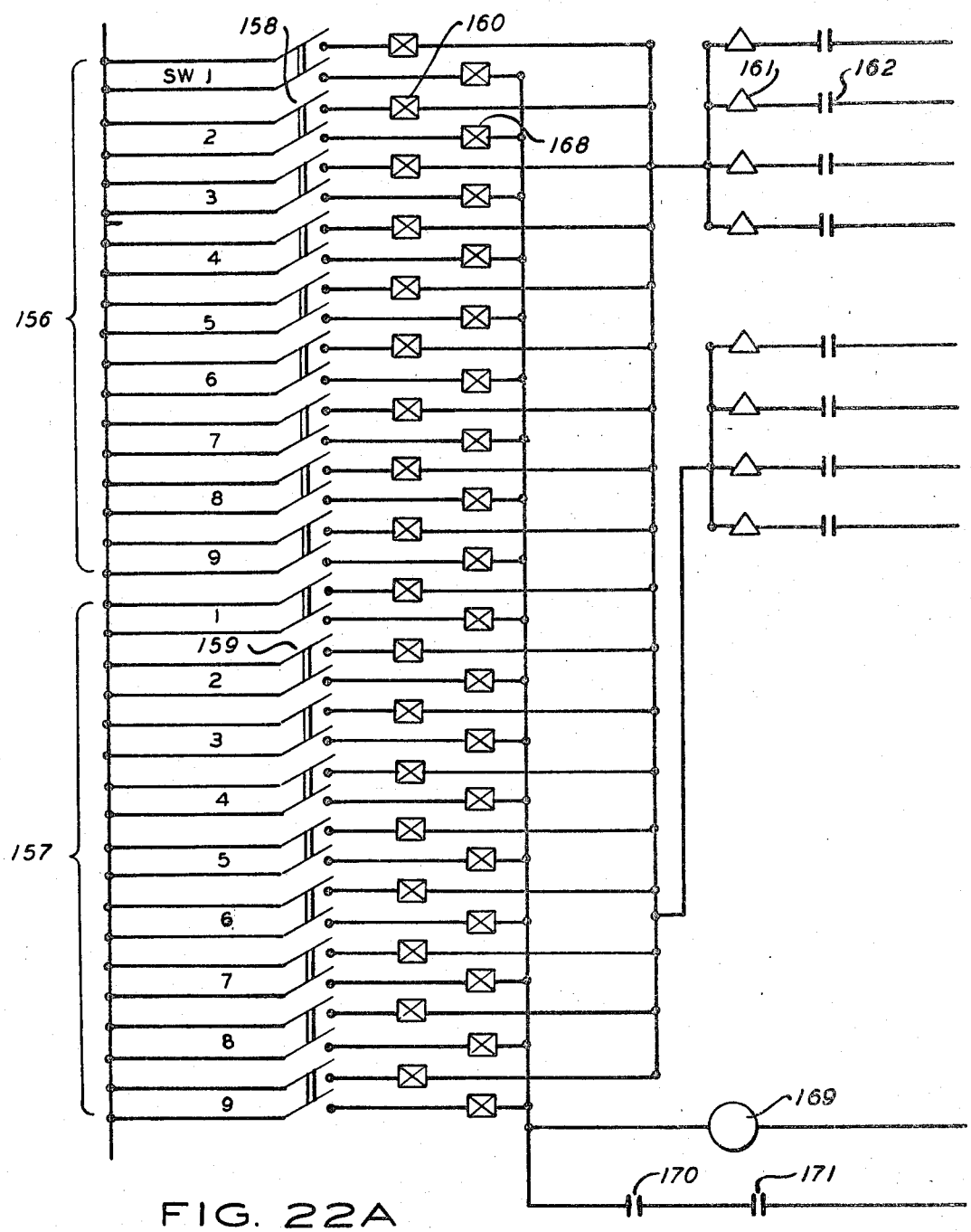
FIGURE 22a is a portion of an electrical circuit diagram for controlling our parking system automatically, the system including an elevator, a loader on the elevator, and a single parking unit.
Figure 22B:
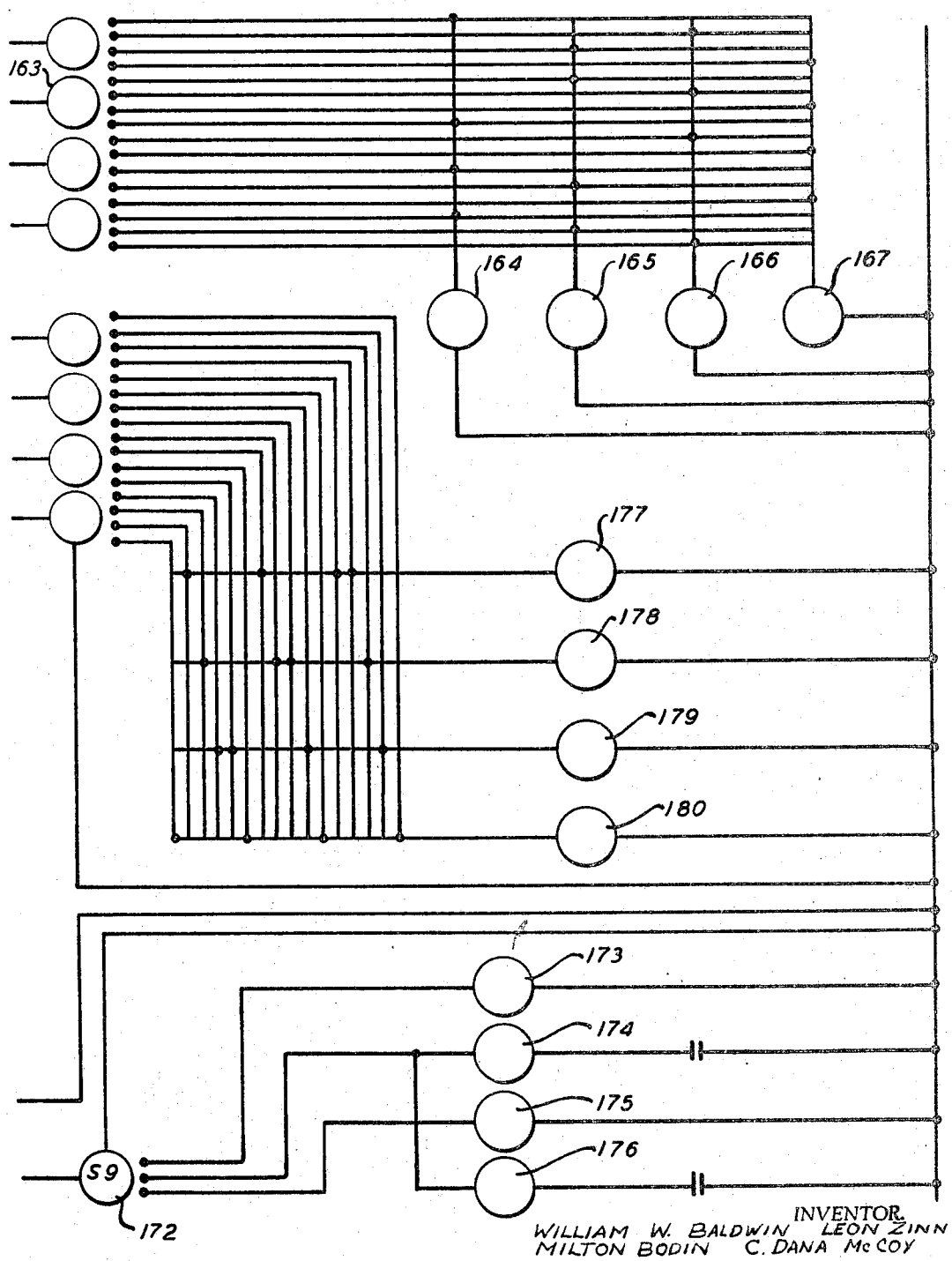
FIGURE 22b is the remainder of the circuit shown in FIGURE 22a matching on points A—A on the respective plates.

Our invention may be controlled by either an electrical or an electronic controlled system. In FIGURES 22a and 22b there is shown an electrical circuit diagram for an electric control system.

There are provided two separate sets of switches in a control room respectively set 156 and set 157. Each switch in each bank of switches 156 and 157 represents a pallet in a single parking unit. The individual switches in both banks 156 and 157 are shown as toggle switches but may be momentary push button switches as will be shown in FIGURES 23a and 23b. The two banks of switches 156 and 157 are provided so that a vehicle may be called irrespective of the particular longitudinal aisle of pallets on which it may be located at any particular time.

By way of illustration if it is desired to obtain a vehicle located on a particular pallet a call board which will be described in detail hereafter indicates whether or not this particular pallet is in the right hand or left hand longitudinal aisle of the particular parking unit. If it is in the right hand unit, toggle switch 158 in bank 156 is closed. On the other hand, if the call board indicates this pallet to be in the left hand aisle, switch 159 in bank 157 is closed. The switches in each bank may be numbered 1 through 9 as shown to indicate each particular pallet, there being 9 pallets in each of the circuits.

When toggle switch 158 is closed, current passes through a normally closed limit switch 160 through a space determining switch 161. Space determining switches, one of which is designated 161, are located at each of the four corners of the parking unit. Either an electrical or a photo-electrical or a mechanical detector of some sort positioned at each corner of a circuit determines which corner position is unoccupied or vacant. The normally opened space detector switch 161 therefore closes to permit current to pass through a limit switch 162 which is activated by motion of the pallet. Each time the pallet moves one position, the limit switch 162 alternately opens and closes generating a pulse of current through a stepping relay 163. The stepping relay 163 energizes, in proper sequence, motor starters 164, 165, 166 and 167 controlling the longitudinal and transverse motions of the respective pallets. As the empty position in the parking unit changes, of course, different space determining switches, 161 will close depending upon where the empty space was initially.

Once the stepping relay 163 initiates a sequence to operation of motors 164, 165, 166 and 167, the sequencing continues until the desired pallet reaches a position adjacent to the elevator or loading station. When the desired pallet reaches the elevator normally closed limit switch 160 opens and normally closed limit switch 168 closes. Limit switches 160 and 168 are located on the pallet and are adapted to operate either mechanically, electrically or photo-electrically by movement of the pallet into the position adjacent to the elevator.

When the limit switch 168 closes, the elevator call relay 169 is energized causing the elevator to move to the proper floor level. As the elevator reaches the proper floor level, elevator limit switch 170 and the loader limit switch 171 close to commence loader sequence. Switch 171 causes stepping relay 172 to initiate operation of motor starters 173, 174, 175 and 176 in sequence thereby causing the loader to leave the elevator, move onto the pallet, deposit the car thereon and withdraw from the pallet onto the elevator again.

The operation of bank 157 is identical to that of 156 excepting that motor starters 177, 178, 179 and 180 operate the motors in the reverse direction. Therefore, if switches in bank 156 cause clockwise movements of the pallets in the units, switches in 157 will cause counterclockwise movement.

Figure 23A:
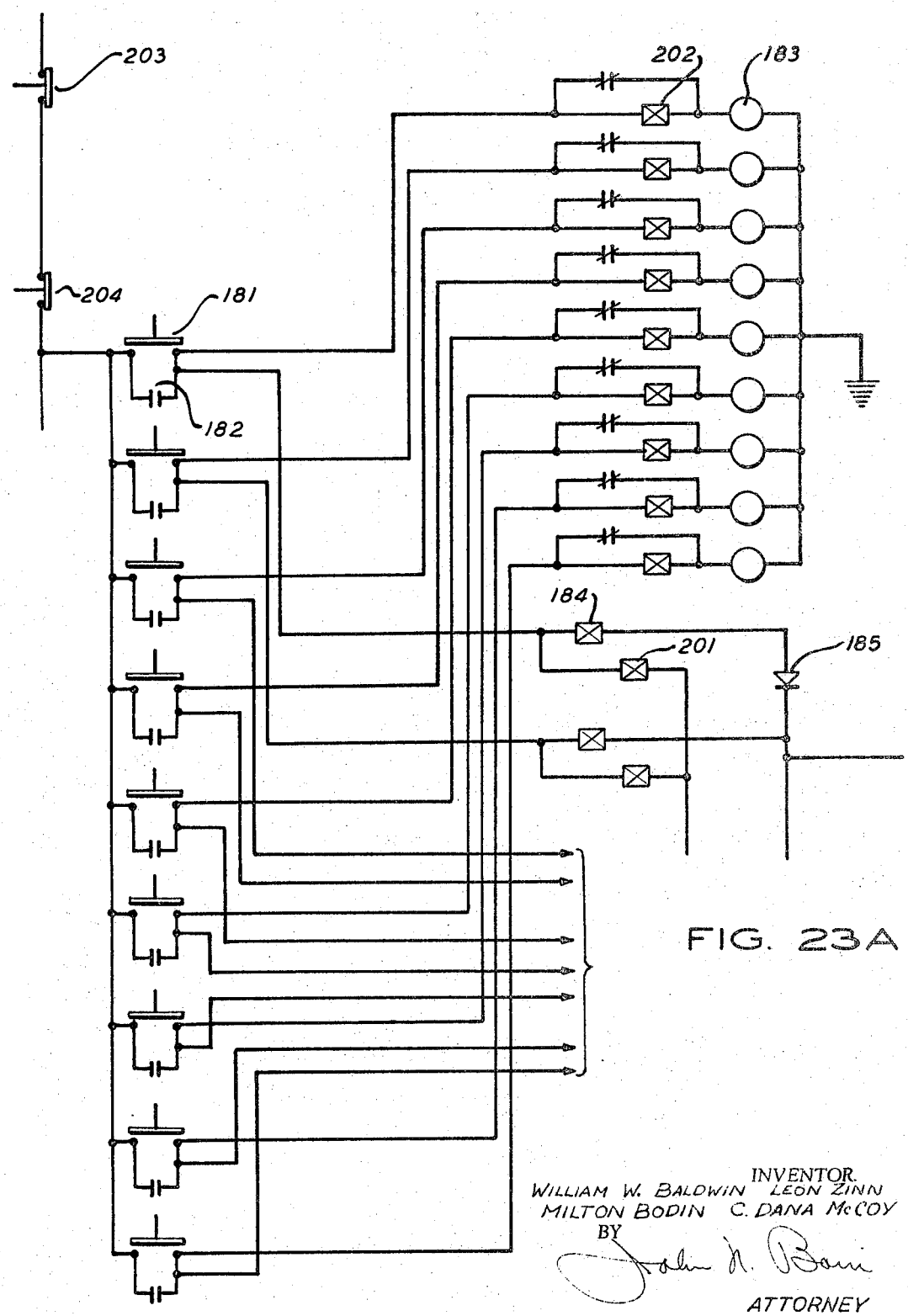
FIGURE 23a is a portion of an electrical circuit diagram showing a typical control circuit for either the right hand side or the left hand side of a generally rectangular, closed circuit parking unit.
Figure 23B:
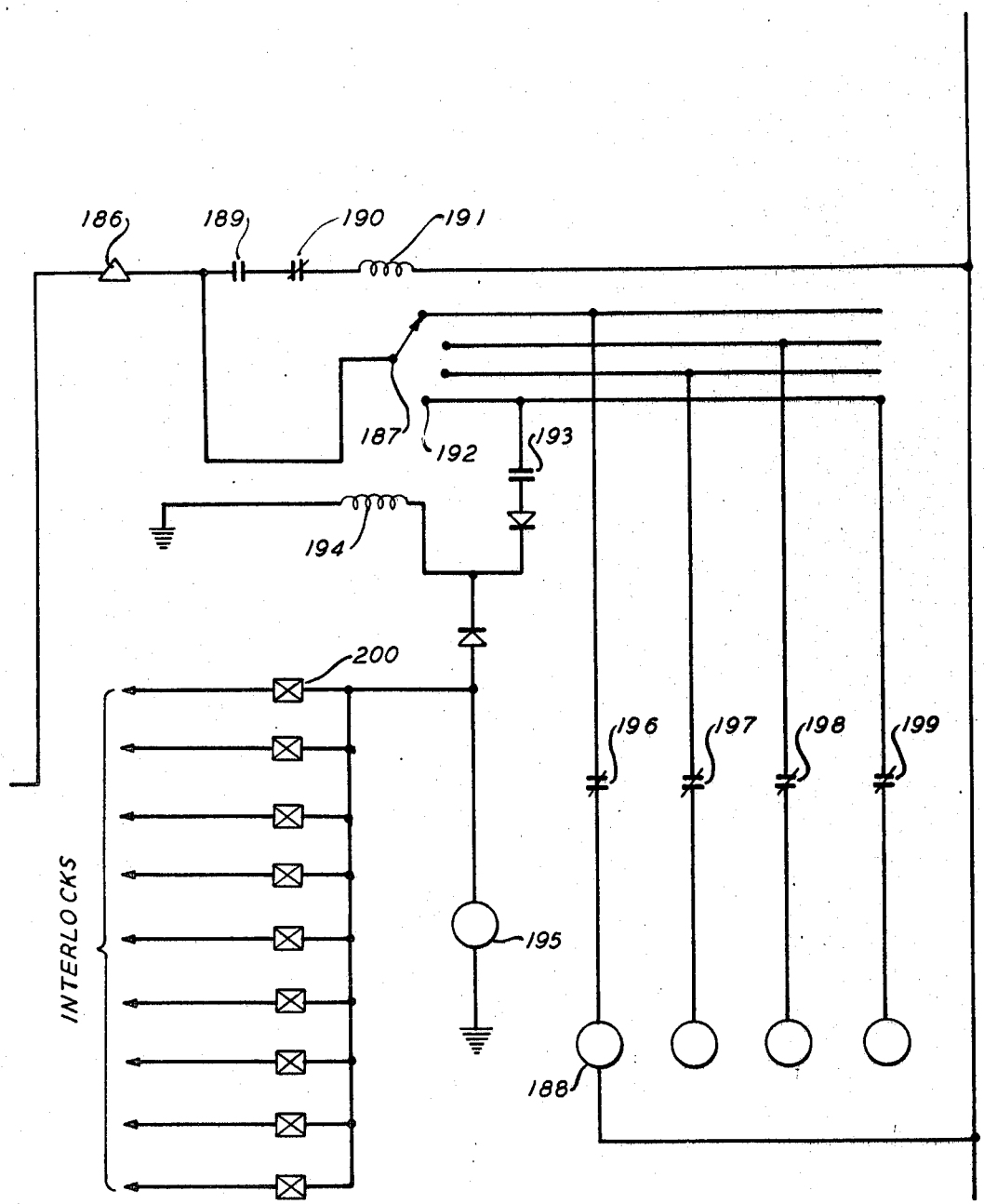

FIGURES 23a and 23b show an alternative control circuit employing momentary push button switches. The operation however is substantially the same as the circuit shown in FIGURES 22a and 22b.

In FIGURE 23a, momentary push button switch 181 is pushed to obtain the desired pallet. It should be noted that the momentary push button switches shown in FIGURE 23a represent only one longitudinal aisle of a particular parking unit. A similar bank of momentary push button switches would be provided for the opposite aisle in accordance generally with the description of FIGURES 22a and 22b.

Momentary push button switch 181 energizes interlock 182 through holding coil 183. Thus current will continue to pass through the momentary push button switch 181 through a normally closed limit switch 184 and a diode 185 to guard against sneak circuits and from thence through space determining relay 186 and from thence through a stepping switch 187 which energized motor starter 188 to begin sequence operation of the pallet motors. Each time the stepping switch 187 changes its position, limit switch 189 operated by motion of the pallet which is normally opened closes passing current through the relay contacts (limit switch) 190 and the stepper coil 191. This inturn causes the stepping switch 187 to advance one position. When the fourth position 192 of the stepping switch 187 has been reached, limit switch 193 closes passing current into a stepper reset coil 194 which resets the stepper switch 187 back to its initial position. The sequence is then repeated and repeated still again as often as is necessary to bring the desired pallet adjacent to the elevator or loading station.

When the elevator is in the proper position adjacent to the pallet carrying the desired car, the normally opened limit switch 200 related to push button 181 will close mechanically thus, passing current to and through interlock 182, completing a circuit to relay 195 which thus opens limit switches 196, 197, 198 and 199 ensuring resetting of the stepping switch 187. In turn, normally closed limit switch 184 mechanically opens, when the desired pallet reaches the elevator position, and the normally open limit switch 201 closes, which then provides energy to the elevator call relay not shown in this drawing and brings the elevator to the proper level. When limit switch 184 opens, of course, the sequence controlled by stepping switch 187 ceases. In addition, when the pallet is in front of the elevator or loading station, normally closed limit switch 202 opens thereby de-energizing holding relay 183 and resetting momentary push button switch 181.

In an emergency, stop switches 203 and 204 may be closed to de-energize the entire control panel stopping all motion instantly.

Figure 24:
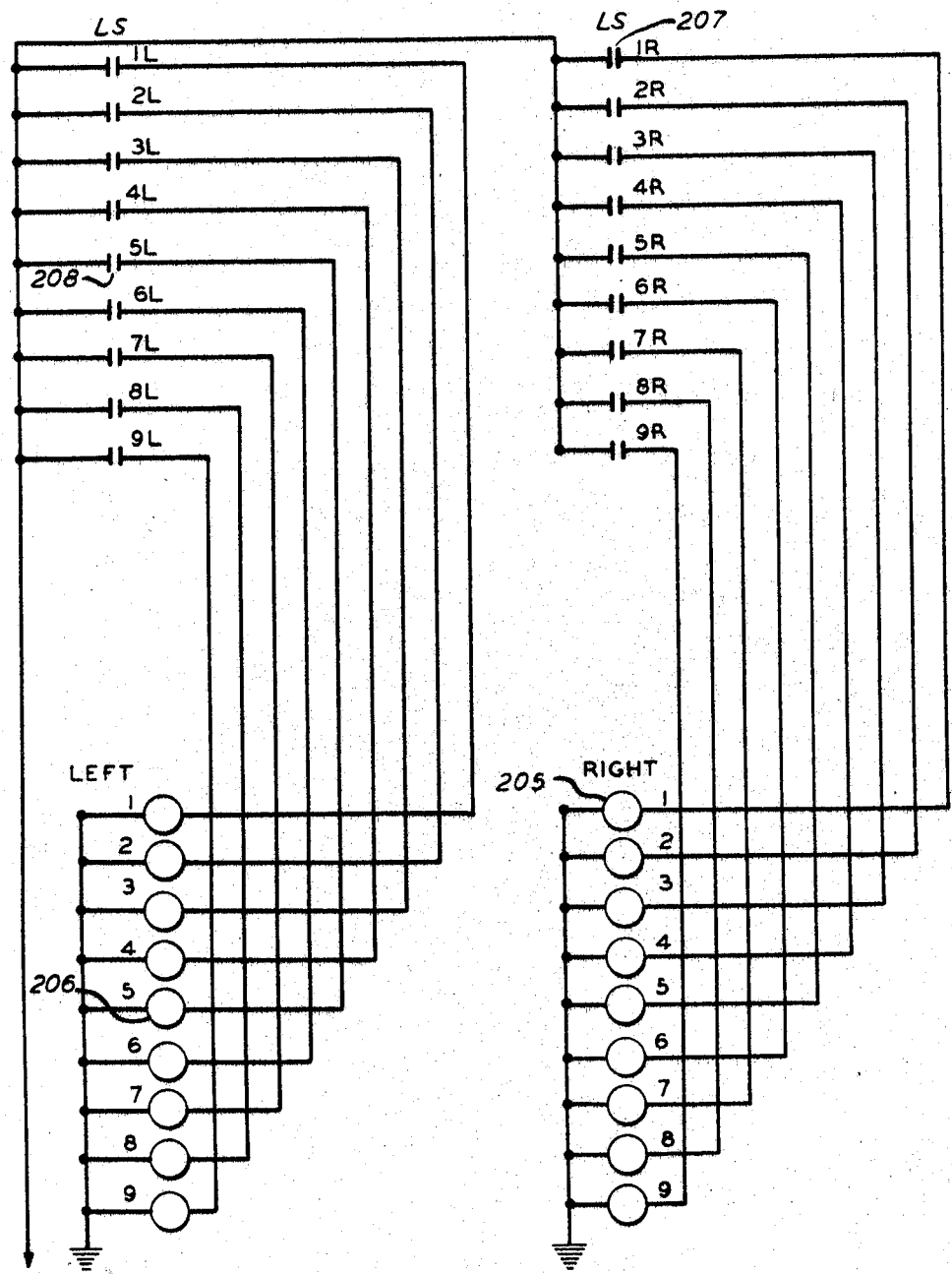
FIGURE 24 is an electrical circuit diagram showing the details of a left or right side position indicator system.

FIGURE 24 shows a left or right side position indicator panel. This indicator shows whether or not a particular pallet is in the left hand or the right hand aisle of the parking circuit. The indicator will also indicate whether or not each particular pallet is on the right or left hand side. As for instance, if pallet number 1 is on the right hand side, light 205 will be illuminated; whereas if pallet number 5 were on the left hand side, light 206 would be illuminated. Illumination of the respective lights is accomplished by detector means on the pallet which is adapted to engage switch means on the building to cause the light to be energized. On the right hand side, for instance, the mechanical pickups are in one position whereas on the left hand side the pickups are in another position. If, for instance, pallet number 1 is on the right hand side, limit switch 207 would be closed whereas if pallet number 5 were on the left hand side limit switch 208 would be closed. This call register tells only whether the pallet is on the right or left hand side but cannot tell whether or not the pallet is loaded. Whether or not the particular pallet is loaded is determined by an in-out register to be described in detail hereafter.

FIGURES 22a and 22b, 23a and 23b, and 24 illustrate the wiring diagram for the electrical control system. The remaining figures illustrate the electronic control system.

Figure 25:
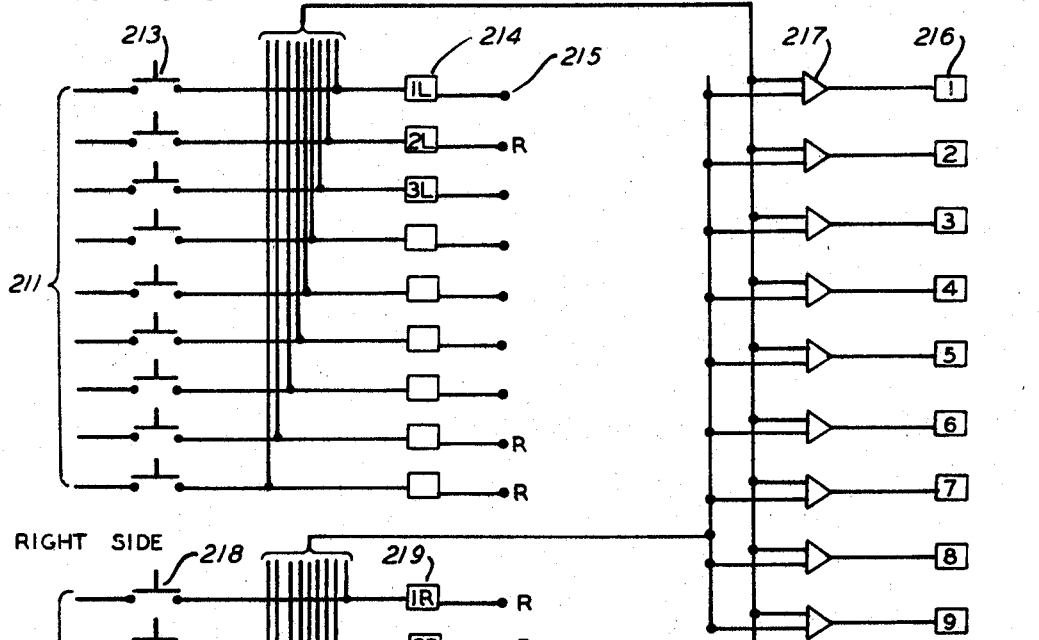
FIGURE 25 is an electrical circuit diagram of a typical car call and in/out register.

FIGURE 25 illustrates a car-call and an in-out register. If it is desirable to obtain a vehicle located on the left hand aisle of the parking unit, one of the push button switches in bank 211 is energized. Conversely, if the pallet is on the right hand side one of the push button switches in bank 212 is actuated. For instance, actuation of push button 213 energizes flip-flop switch 214. Terminal 215 is the flip-flop reset terminal. Energizing flip-flop 214 energizes commutating flip-flop 216 through an OR circuit 217. Push button 218 on the right hand bank 212 energizes flip-flop 219 and flip-flop 216 as well. The commutating flip-flops are connected to an indicator lamp which will of course indicate whether or not the car is in or out. In this manner, the commutating flip-flops with their indicator lights will indicate whether or not the pallet is occupied by a car. It should be noted that flip-flop 214 is adapted to actuate other control systems when push-button 213 is actuated.

Figure 27:
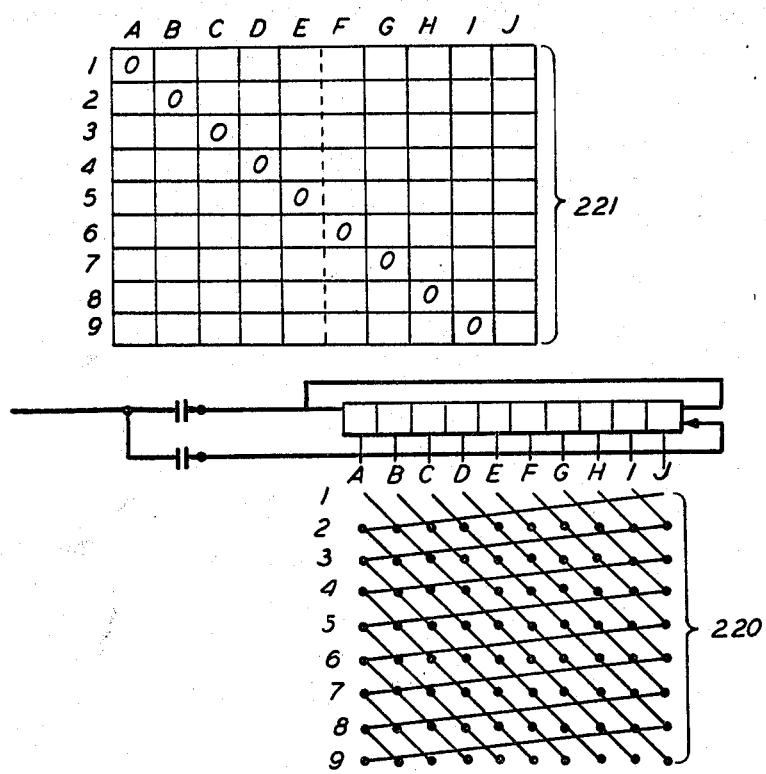
FIGURE 27 is an electrical circuit diagram of a typical vehicle position indicator employing flip-flop switches.

FIGURE 27 illustrates a car position indicator. The car position indicator is basically a forward and backward sequence counter activated by limit switches. Light indicating the position of the various pallets are shown in a rectangular bank or panel 220. The indicator lights are in back of or shine through a panel board shown as a rectangle 221. The flip-flops are energized by pulses coming from the right side or left side interlock switches each time there is a motion in the parking unit.

Figure 28:
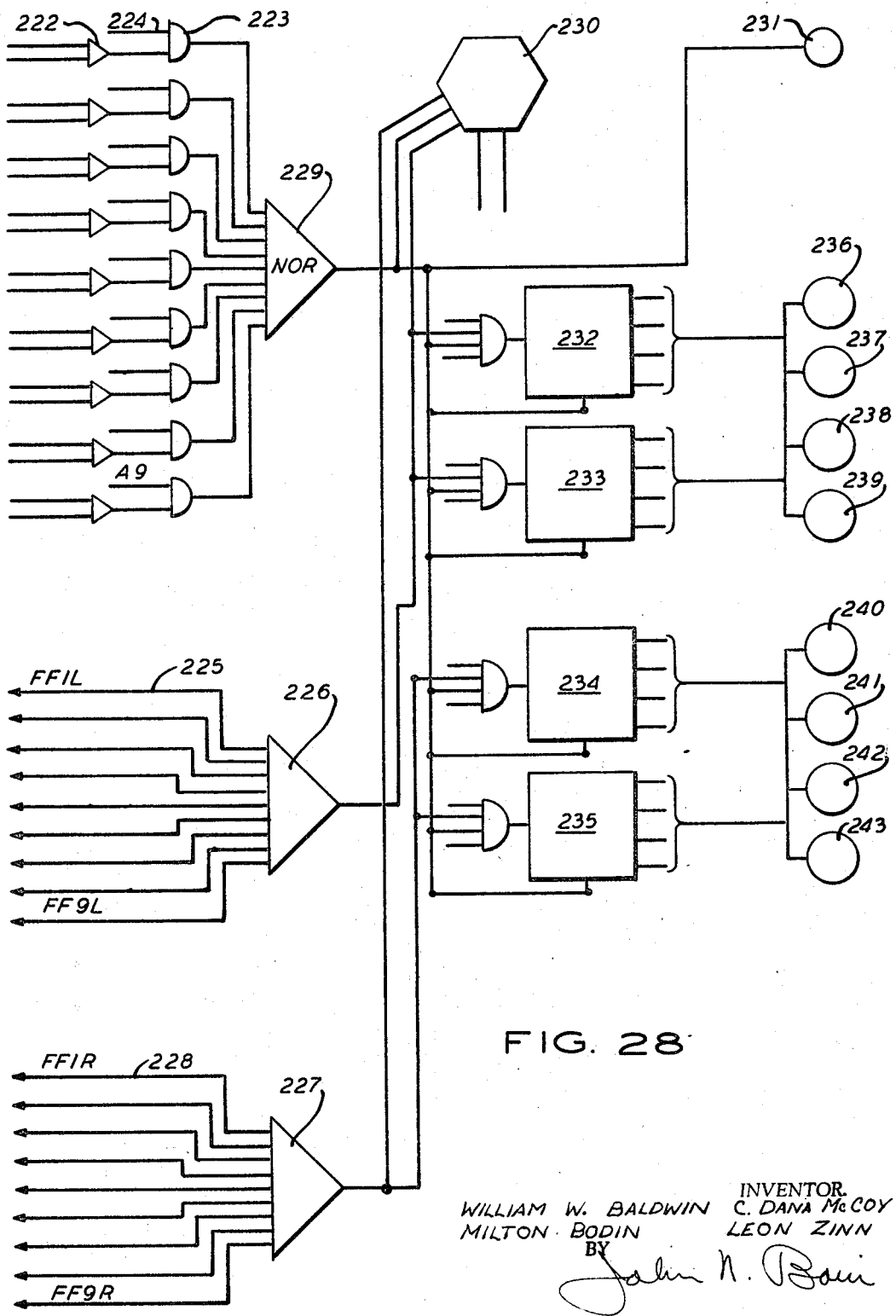
FIGURE 28 is an electrical circuit diagram for a typical in-out vehicle register.

FIGURE 28 illustrates the basic electronic control system operating both the pallet and loader movements. If the momentary push button switch 213 in FIGURE 25 is activated, regular flip-flop 214 is energized. In turn, flip-flop 214 energizes an OR circuit 222. In turn if there is a signal in the OR circuit 222, a signal will be fed into an AND circuit 223. In addition, current will enter the AND circuit 223 through terminal 224 connected to the corresponding output on the car position indicator described above. In addition, the output from flip-flop 214 is connected through conduit 225 into an additional OR circuit 226. Simultaneously, the right hand bank of switches 211 in FIGURE 25 will feed an additional OR circuit 227. In this case, current from push button 218 will come through conduit 228.

A signal from AND circuit 223 is fed into a NOR circuit 229 which in turn energizes a space counter 230. In addition, the NOR circuit 229 energizes an elevator call relay 231 closing the elevator to immediately seek the proper level. OR circuit 226 or 227 will energize left and right hand sequence counters, 232, 233, 234 and 235 depending upon whether or not the car is on the left or right hand side. This in turn will energize the proper sequence of motor operation through motor starter relays 236, 237, 238, 239, 240, 241, 242 and 243. The space counter 230 determines which of the sequence counters 232, 233, 234 or 235 will operate to control the sequence for the respective motors. It should be noted that the space counter determines the position in the empty space in the parking unit and thence determines the direction and sequence of movement for the pallet to bring it into any position adjacent to the elevator. The space counter will be described in greater detail hereafter.

As the desired pallet reaches a position adjacent to the elevator, AND circuit 223 is energized thus energizing NOR circuit 229 to call the elevator through elevator relay 231. In addition, it simultaneously terminates the operation of the sequence counters and changes the space counters as to indicate the new position of the empty space. This system is ready again for a call for a pallet.

Figure 26:
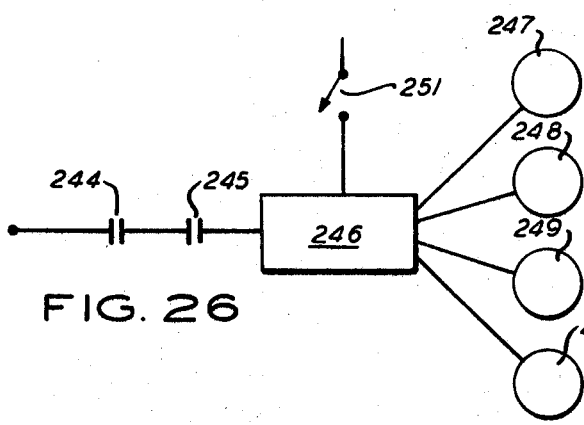
FIGURE 26 is an electrical circuit diagram of a typical loader sequence relay system.

FIGURE 26 illustrates the circuitry for the control for the loader sequence. The elevator has reached a position adjacent to the pallet, limit switch 244 closes energizing loader sequence counter 246 through limit switch 245 operative when the loading is in position for operation. The loader sequence counter 246 then energizes motor starter relay 247, 248, 249 and 250 in sequence to move the loader onto the pallet, discharge the car thereon and bring the loader back onto the elevator or, in the reverse situation, to pick up the car from the pallet and bring it onto the elevator. Depending upon whether or not in-out position switch 251 is pushed, will control whether or not the loader deposits a car on the pallet or picks up a car from the pallet. Of course, switch 251 would be in the control room.

Figure 29:
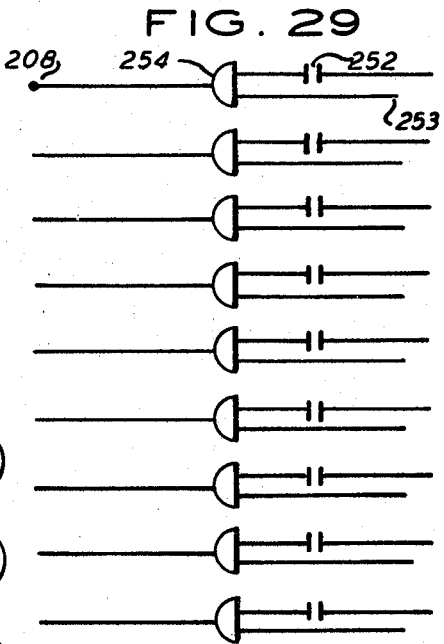
FIGURE 29 is an electrical circuit diagram for resetting flip-flop switches in the vehicle call circuit.

FIGURE 29 illustrates the circuitry adapted to reset the flip-flops in the basic control system. When the loader has returned to its initial position loader limit switch 252 closes. Signal 253 is a signal from the car position indicator. It, with the signal from switch 252 is fed into an AND circuit 254 which is energized sending a signal to the reset terminal 215 of flip-flop 214 thereby resetting flip-flop 214.

FIGURE 30 illustrates an electrical wiring diagram employed to control acceleration and deceleration of the motors generating movement in both the pallets and the loader. This wiring diagram is particularly adapted to automatically pick out a value of resistance to be applied to the input power signal to the motor so as to control acceleration. A DC signal from the motor starter relay is imposed upon a CR circuit also known as a differentiating circuit 255. The CR circuit differentiates the DC signal converting it into a positive pulse or marker signal which is input into a 1-shot multi-vibrator 256. The 1-shot multi-vibrator generates a positive square wave having a given period of time. This square wave is imposed upon a second CR circuit 257 having a diode 258 connected thereto. The diode 258 permits only negative voltage to pass therethrough. Thus, on the output side of the diode 258, there is generated a marker wave for a particular period of time having a particular width which can be adjusted by the CR circuit 257. This signal is the input into an AND circuit 259. The AND circuit 259 is also fed by a frequency taken from the motor. The frequency may be in the form of a tachometer generated EMF or some other EMF related to the rotational speed of the motor. The AND circuit 259 will fire only during the preset time derived from the second CR circuit 257 passing through the diode 258. Thus, only a particular frequency will pass through and into a plurality of tuned resonating circuits 260, 261, 262 and 263. One of the tuned circuits 260 through 263 will resonate with the particular frequency generated from the AND circuit 259 and will thus fire a locking relay 264 connected thereto. The particular locking relay 264 energizes a pre-determined value of resistance across the input power to the polyphase windings of the particular squirrel cage motor to which it is connected. Thus, the motor input power is decreased by a particular value of resistance which has been chosen according to its initial speed of rotation. In the event that the initial speed of rotation is extremely high, a high value of resistance is chosen to quickly reduce acceleration of the motor. Conversely, if the initial rotation of the motor is extremely slow a lower value of resistance will be applied thereby permitting greater power to accelerate the motor.

Similarly, deceleration of the motor may be affected by imposing a DC current onto the polyphase windings of the squirrel cage motor. The same sort of control circuit is employed to determine the value of this DC current. In addition it should be noted that the signal input into the AND circuit 259 derived from the motor need not necessarily be frequency oriented but can also be amplitude oriented related to the EMF. Thus, the motor would be amplitude controlled rather than speed of rotation controlled.

FIGURE 31 illustrates an alternative motor acceleration and deceleration control wiring diagram. Here too, a value of resistance to be placed in series with the input signal to the motor is chosen. A signal from the car position indicator is the input into an OR circuit 265. If any car is in one of the five positions assuming 5 positions on one side of the circuit, a signal passes into a plurality of AND circuits 266 equal in number to the number of cars in the particular unit. A signal is fed into the AND circuit from the car-present indicator. Thus, one of the AND circuits 266 will fire if signals from two inputs are supplied to the AND circuit simultaneously. The output from the firing AND circuit 266 is input into a plurality (shown here to be four) of OR circuits 267, 268, 269 and 270. OR circuits 267 contains connections for input signals from pallets 1 through 6; OR circuit 268 contains connections for inputs from pallets 2 through 7; OR circuit 269 contains connections for inputs from pallets 3 through 8 and OR circuit 270 contains connections for inputs from pallets 4 through 9. Each of the OR circuits 267, 268, 269 and 270 are connected to an AND circuit 271. If no vehicle is present, the AND circuit 271 will not fire and a full value of resistance will be applied to the motor to decrease acceleration due to the low load bearing thereon. However, if the AND circuit 271 is energized, it means that current is passing from all four of the OR circuits 267, 268, 269 and 270. This in turn means that at least four vehicles are present and relay 272 closes. If relay 272 closes the value of resistance is chosen to slightly increase acceleration of the motor. If relay 272 is not closed the NOT circuit 273 will be energized passing current into another AND circuit 274 which in turn is connected to an OR circuit 275. The OR circuit 275 is connected to pallets 1 through 9. If a signal is coming from OR circuit 275 and NOT circuit 273, AND circuit 274 will fire closing relay 276. This, by logic, means that at least one vehicle is present on a pallet but less than four vehicles are present. This same sequence of connections through AND, OR and NOT circuits is repeated to determine the number of pallets and hence the proper resistance to be applied across the motor.

Figure 32:
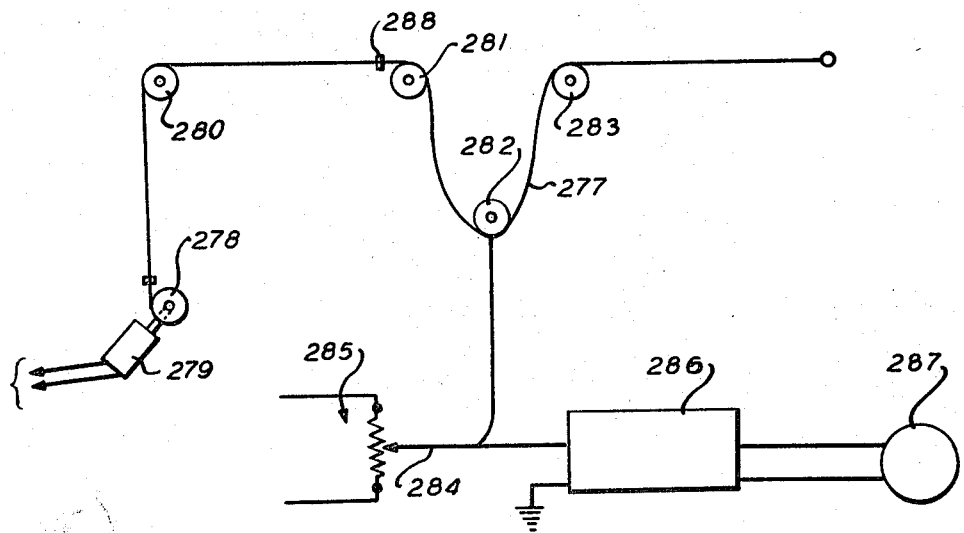
FIGURE 32 is a schematic diagram of an electromechanical loader position control system.

FIGURE 32 illustrates a loader drive motor control servo mechanism adapted to return the loader to the same position after each sequence of motion. This control system comprises generally a differential pulley error sensing device. A light chain 277 is connected at one end to a pulley 278 driven by a light motor 279. The motor 279 is mounted on the elevator. The opposite end of the chain 277 is connected to the frame of the loader. The chain 277 passes over fixed pulleys 280 and 281 beneath a movable idler pulley 282 and from thence over another fixed pulley 283; from thence it is connected to the loader. The idler pulley 282 is mechanically connected to a sliding potentiometer pickup 284. The potentiometer 285 is connected to an amplifier 286 which generates a signal to the loader motor 287. In operation, when the loader moves from the elevator, the motor 279 is actuated to feed out the chain 277 at a controlled rate and for a controlled period of time. The time is determined by a striker 288 fastened to the chain 277 which engages a limit switch after the loader has moved the proper distance onto the pallet thereby shutting down the loader motor drive. However, if the loader has travelled either too short or too long a distance in fact, the idler pulley will have moved up or down and displaced the pickup arm 284 on the potentiometer 285. A changed signal from the potentiometer 285 will be input into the amplifier 286 which will activate the loader motor 287 until the potentiometer pickup arm 284 is again centered. Thus, the rest position of the loader either on the pallet or on the elevator is unerringly determined.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

We claim:
1. A pallet comprising,
 (a) a base, the base having a pair of generally parallel sides,
 (b) bearing support means on the base,
 (c) a plurality of generally parallel, coplanar, spaced ribs mounted above the base, the ribs extending inwardly toward each other but spaced endwise to define a central passage,
 (d) a continuous rack gear on the bottom of the base parallel to one side of the base extending from end to end thereof,
 (e) a pair of generally parallel continuous rack gears on the top of the base generally perpendicular to the ribs, and
 (f) the ribs and the base defining a space therebetween, the space being open at both ends opposite the ends of the rack gears and communicating with the passage.

2. An apparatus for automatically parking vehicles, a combination loader and pallet comprising,
 (a) a pallet base having a pair of generally parallel side members,
 (b) bearing support means on the base,
 (c) a plurality of generally parallel, coplanar, spaced ribs mounted above the base, the ribs extending inwardly toward each other but spaced endwise to define a central passage,
 (d) a continuous rack gear on the bottom of the base parallel to one side member thereof and extending from end to end thereof,
 (e) a pair of generally parallel, continuous rack gears on the top of the base generally perpendicular to the ribs, and
 (f) the ribs and the base defining a space therebetween, the space being open at both ends opposite the ends of the rack gears and communicating with the passage,
 (g) a generally rectangular loader base frame having a pair of parallel side members,
 (h) a plurality of drive gears on the side members, the drive gears spaced apart a distance just sufficient to permit them to mesh with the rack gears on the top of the base of the pallet,
 (i) the loader base frame being just sufficiently narrow to pass through the space defined by the ribs and base of the pallet,
 (j) a vertically movable, generally rectangular support frame mounted on the loader base frame, the said support frame having a pair of generally parallel side members,
 (k) means connecting the base frame of the loader to the support frame for raising and lowering the support frame, the same means being just sufficiently narrow to pass vertically through the passage between the ends of the ribs on the pallet, and
 (l) a plurality of coplanar, spaced ribs on each side member of the loader support frame extending outwardly therefrom, the ribs on the loader support frame and the ribs on the pallet being spaced in offset vertical registration with each other, the ribs on the loader support frame adapted to pass between the ribs on the pallet upon vertical movement of the loader support frame with respect to the pallet.

References Cited

UNITED STATES PATENTS

| | | | |
|---|---|---|---|
| 2,014,351 | 9/1935 | Becker | 214—16.1 |
| 2,752,051 | 6/1956 | Strahm et al. | 214—16.1 |
| 2,849,126 | 8/1958 | Kerekes | 214—16.1 |
| 2,967,634 | 1/1961 | Bogar et al. | 214—16.1 |

GERALD M. FORLENZA, *Primary Examiner.*

R. B. JOHNSON, *Assistant Examiner.*